(12) United States Patent
Ye et al.

(10) Patent No.: US 10,647,786 B2
(45) Date of Patent: *May 12, 2020

(54) SUPPORTED CATALYST SYSTEMS AND PROCESSES FOR USE THEREOF

(71) Applicant: ExxonMobil Chemical Patents Inc., Baytown, TX (US)

(72) Inventors: Xuan Ye, Houston, TX (US); John R. Hagadorn, Houston, TX (US); Matthew W. Holtcamp, Huffman, TX (US); Gregory S. Day, College Station, TX (US); David F. Sanders, Beaumont, TX (US)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/564,572

(22) PCT Filed: Mar. 10, 2016

(86) PCT No.: PCT/US2016/021755
§ 371 (c)(1),
(2) Date: Oct. 5, 2017

(87) PCT Pub. No.: WO2016/171809
PCT Pub. Date: Oct. 27, 2016

(65) Prior Publication Data
US 2018/0086859 A1 Mar. 29, 2018

Related U.S. Application Data

(60) Provisional application No. 62/149,818, filed on Apr. 20, 2015.

(30) Foreign Application Priority Data

Jun. 12, 2015 (EP) .................................. 151718061

(51) Int. Cl.
*C08F 4/64* (2006.01)
*C08F 4/60* (2006.01)
(Continued)

(52) U.S. Cl.
CPC ...... *C08F 4/64148* (2013.01); *C08F 4/60148* (2013.01); *C08F 4/642* (2013.01);
(Continued)

(58) Field of Classification Search
None
See application file for complete search history.

(56) References Cited

U.S. PATENT DOCUMENTS 6,103,657 A 8/2000 Murray
6,664,348 B2 12/2003 Speca
(Continued)

FOREIGN PATENT DOCUMENTS

WO 96/00243 A 1/1996
WO 96/00245 A 1/1996
(Continued)

OTHER PUBLICATIONS

Advances in Polyolefins: The World's Most Widely Used Polymers, Seymour and Cheng (eds.), Springer Science & Business Media, pp. 341-342 (1987). (Year: 1987).*

*Primary Examiner* — Catherine S Branch
(74) *Attorney, Agent, or Firm* — ExxonMobil Chemical Patents, Inc.—Law Department

(57) ABSTRACT

This invention relates to a supported catalyst system and process for use thereof. In particular, the catalyst system includes a pyridyldiamido transition metal complex, an activator and a support material. The catalyst system may be used for preparing ultrahigh molecular weight polyolefins.

24 Claims, 1 Drawing Sheet

(51) Int. Cl.
*C08F 4/659* (2006.01)
*C08F 4/642* (2006.01)
*C08F 10/02* (2006.01)
*C08F 210/16* (2006.01)
*C08F 210/14* (2006.01)
*C07F 7/00* (2006.01)

(52) U.S. Cl.
CPC ............ *C08F 10/02* (2013.01); *C08F 210/14* (2013.01); *C08F 210/16* (2013.01); *C07F 7/003* (2013.01); *C08F 4/659* (2013.01); *C08F 4/65912* (2013.01); *C08F 4/65916* (2013.01); *C08F 2500/01* (2013.01); *C08F 2500/08* (2013.01); *C08F 2500/18* (2013.01)

(56) References Cited

U.S. PATENT DOCUMENTS

| | | | |
|---|---|---|---|
| 6,767,975 B1* | 7/2004 | Liu | C08F 10/00 526/161 |
| 6,846,770 B2 | 1/2005 | Speca | |
| 6,900,321 B2 | 5/2005 | Boussie et al. | |
| 7,973,116 B2 | 7/2011 | Hagadorn et al. | |
| 2002/0142912 A1* | 10/2002 | Boussie | C07F 7/003 502/152 |
| 2003/0130448 A1 | 7/2003 | Liu | |
| 2012/0046380 A1* | 2/2012 | Morrison | A61F 2/30767 522/75 |
| 2012/0071616 A1* | 3/2012 | Hagadorn | C07D 213/38 526/170 |
| 2014/0256893 A1 | 9/2014 | Hagadorn et al. | |
| 2014/0316089 A1 | 10/2014 | Hagadorn et al. | |
| 2015/0141590 A1 | 5/2015 | Hagadorn et al. | |

FOREIGN PATENT DOCUMENTS

| | | |
|---|---|---|
| WO | 2012/004683 A | 1/2012 |
| WO | 2013/028283 A | 2/2013 |
| WO | 2014/123683 A | 8/2014 |

* cited by examiner

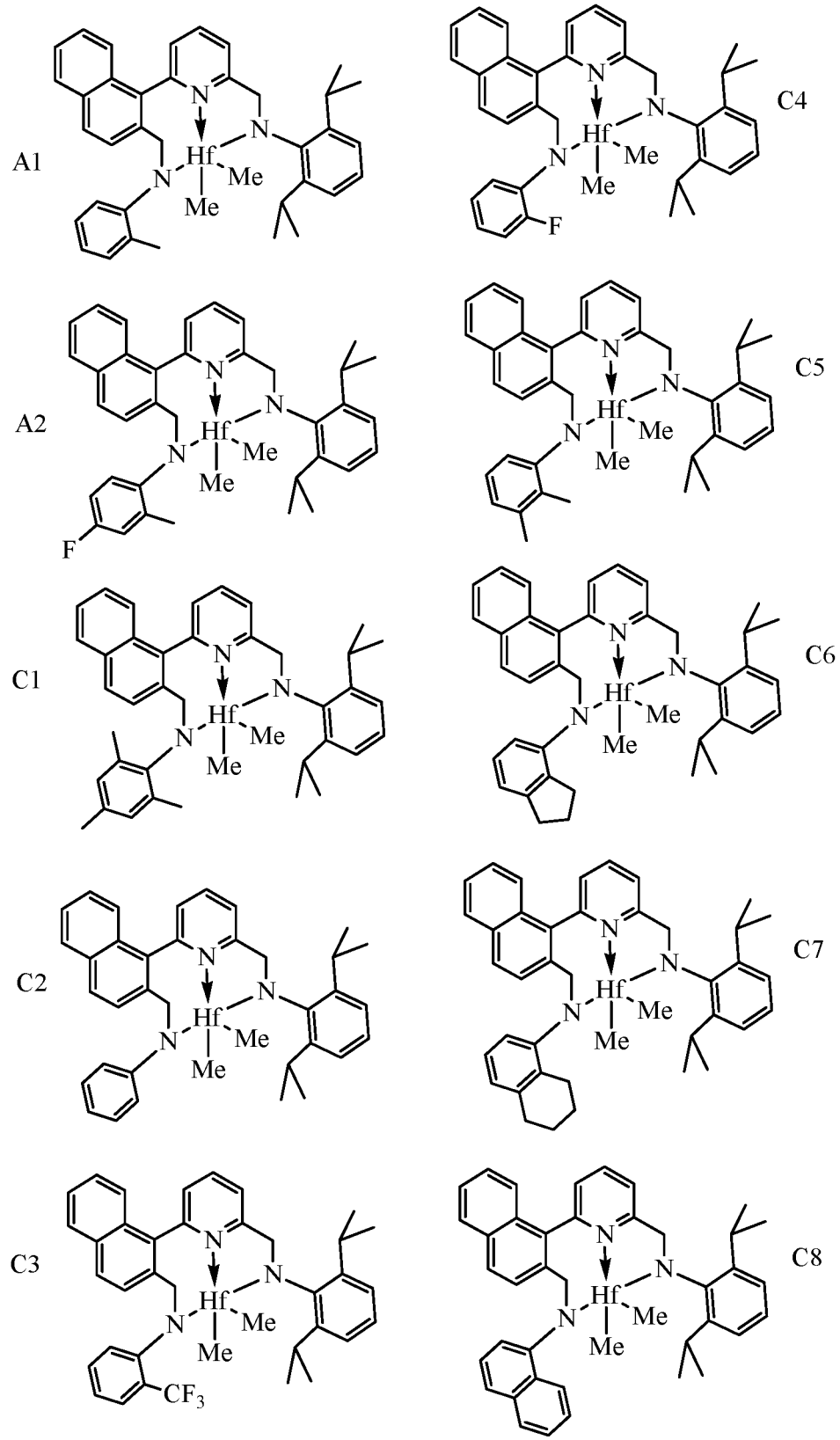

SUPPORTED CATALYST SYSTEMS AND PROCESSES FOR USE THEREOF

CROSS-REFERENCE OF RELATED APPLICATIONS

This application claims the benefit of Provisional Application No. 62/149,818, filed Apr. 20, 2015 and EP Application No.: 15171806.1, filed Jun. 12, 2015.

FIELD OF INVENTION

This invention relates to a supported catalyst system and process for use thereof. In particular, the catalyst system comprises a pyridyldiamido transition metal complex, an activator, and a support material. The catalyst system may be used for olefin polymerization processes.

BACKGROUND OF INVENTION

Olefin polymerization catalysts have many uses in industry. Hence, there is an interest in developing new catalyst systems that increase commercial usefulness and enable the production of polymers having improved properties.

Some supported catalyst systems, including metallocene catalysts, have been disclosed. For example, WO 96/00245 describes a method for forming silica supported catalyst systems. Davison 948 silica is used in Examples 1 and 2. WO 96/00243 describes methods for supporting metallocene catalyst systems for the polymerization of propylene. In the examples, Davison 948 silica is used as are chiral bridged metallocenes useful for the polymerization of isotactic polypropylene.

In addition, U.S. Pat. Nos. 6,846,770 and 6,664,348 further disclose metallocene catalyst compositions containing a support that has been fluorided using a fluoride-containing compound and their use in making polypropylene in a slurry process.

For those non-metallocene catalysts, such as pyridyl amines, have been used to prepare Group 4 complexes, which are useful transition metal components for use in the polymerization of olefins, see, for example, US 2002/0142912; U.S. Pat. Nos. 6,900,321; and 6,103,657; where the ligands have been used in complexes in which the ligands are coordinated in a bidentate fashion to the transition metal atom. Another example, U.S. Pat. No. 7,973,116 provides pyridyldiamido transition metal complexes and intermediates to polymerize olefins using such pyridyldiamido compounds. Other background references include US 2015/141590, US 2014/256893, US 2014/316089, WO 2013/028283, and WO 2014/123683.

It is desirable in the art to develop improved catalyst systems for the polymerization of olefins in order to achieve increased activity or specific polymer properties (such as high melting point and high molecular weight), to increase conversion or comonomer incorporation, or to alter comonomer distribution, without deteriorating the resulting polymer's properties.

SUMMARY OF INVENTION

This invention relates to a supported catalyst system comprising: (i) a pyridyldiamido transition metal complex having the general formula (I);

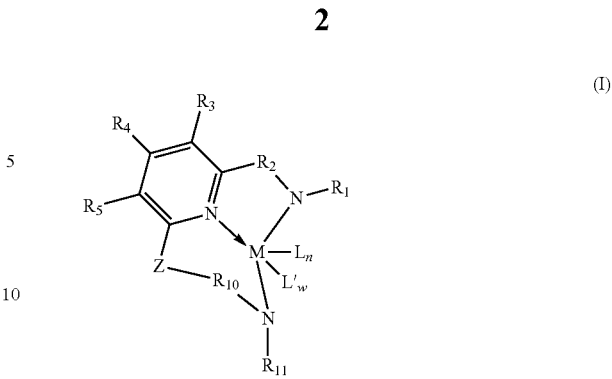

(ii) an activator; and (iii) a support material;
wherein,
M is a Group 3, 4, 5, 6, 7, 8, 9, 10, 11, or 12 metal;
Z is $—(R_{14})_pC—C(R_{15})_q—$, where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1 or 2, and q is 0, 1 or 2;
$R_1$ and $R_{11}$ are independently selected from the group consisting of hydrocarbyls, substituted hydrocarbyls, and silyl groups;
$R_2$ and $R_{10}$ are each, independently, $—E(R_{12})(R_{13})—$ with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to each other or to $R_{14}$ or $R_{15}$ to form a saturated heterocyclic ring, or a saturated substituted heterocyclic ring where substitutions on the ring can join to form additional rings;
$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;
L is an anionic leaving group, where the L groups may be the same or different and any two L groups may be linked to form a dianionic leaving group;
n is 0, 1, 2, 3, or 4;
L' is neutral Lewis base; and
w is 0, 1, 2, 3 or 4.

This invention also relates to a process for polymerization of olefin monomers comprising contacting one or more monomers with the above supported catalyst systems.

This invention also relates to an ultrahigh molecular weight polyolefin catalyzed by the above supported catalyst systems.

BRIEF DESCRIPTION OF THE DRAWINGS

FIG. 1 provides some of the formulae for the pyridyldiamido transition metal complex described herein.

DETAILED DESCRIPTION OF THE PRESENT INVENTION

Selected embodiments will now be described in more detail, but this description is not meant to foreclose other embodiments within the broader scope of this disclosure.

For purposes of this invention and the claims thereto, a "supported catalyst system" is defined to mean a complex/activator pair on a support material. When "supported catalyst system" is used to describe such a pair before activation, it means the un-activated catalyst complex (pre-catalyst) together with an activator and, optionally, a co-activator. When it is used to describe such a pair after activation, it means the activated complex and the activator or other charge-balancing moiety. The transition metal compound may be neutral as in a pre-catalyst, or a charged species with a counter ion as in an activated catalyst system. When it is described as comprising neutral stable forms of the components, it is well understood by one of ordinary skill in the art, that the ionic form of the component is the form that reacts with the monomers to produce polymers.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator, which is believed to create a cation as a result of the removal of an anionic group, often referred to as a leaving group, from the transition metal.

Complex, as used herein, is also often referred to as catalyst precursor, pre-catalyst, catalyst, catalyst compound, transition metal compound, or transition metal complex. These words are used interchangeably. "Activator" and "cocatalyst" are also used interchangeably.

The terms "hydrocarbyl radical," "hydrocarbyl" and "hydrocarbyl group" are used interchangeably throughout this document. For purposes of this disclosure, "hydrocarbyl radical" is defined to be $C_1$-$C_{100}$ radicals, that may be linear, branched, or cyclic, and when cyclic, aromatic or non-aromatic.

The term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group, preferably, substituted hydrocarbyl radicals are radicals in which at least one hydrogen atom of the hydrocarbyl radical has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like, or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S.

A heterocyclic ring is a ring having a heteroatom in the ring structure as opposed to a heteroatom substituted ring where a hydrogen on a ring atom is replaced with a heteroatom. For example tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Unless otherwise noted, all melting points ($T_m$) are DSC second melt.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27 (1985).

An "olefin", is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, and so on.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, t-Bu and $^t$Bu are tertiary butyl, iPr and $^i$Pr are isopropyl, Cy is cyclohexyl, THF (also referred to as thf) is tetrahydrofuran, Bn is benzyl, and Ph is phenyl.

This invention relates to a supported catalyst system comprising: (i) a pyridyldiamido transition metal complex having the general formula (I);

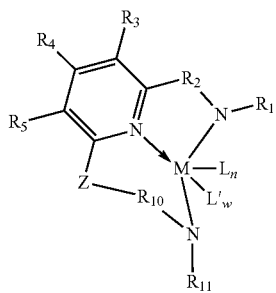

(I)

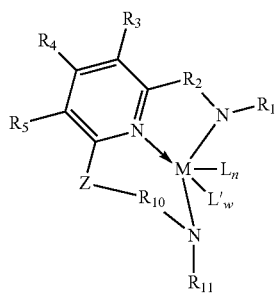

(I)

(ii) an activator; and (iii) a support material; wherein,

M is a Group 3, 4, 5, 6, 7, 8, 9, 10, 11 or 12 metal;

Z is —$(R_{14})_pC$—$C(R_{15})_q$—, where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1 or 2, and q is 0, 1 or 2;

$R_1$ and $R_{11}$ are independently selected from the group consisting of hydrocarbyls, substituted hydrocarbyls, and silyl groups;

$R_2$ and $R_{10}$ are each, independently, —$E(R_{12})(R_{13})$— with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to each other or to $R_{14}$ or $R_{15}$ to form a saturated heterocyclic ring, or a saturated substituted heterocyclic ring where substitutions on the ring can join to form additional rings;

$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

This invention also relates to a process for polymerization of olefin monomers comprising contacting one or more monomers with the above supported catalyst systems.

This invention also relates to an ultrahigh molecular weight polyolefin catalyzed by the above supported catalyst systems.

Pyridyldiamido Transition Metal Complex

In one aspect of the invention, the supported catalyst systems comprise a pyridyldiamido transition metal complex having the general formula (I):

M is a Group 3, 4, 5, 6, 7, 8, 9, 10, 11 or 12 metal, preferably a group 4 metal, more preferably Ti, Zr, or Hf;

Z is —$(R_{14})_pC$—$C(R_{15})_q$—, where $R_{14}$ and $R_{15}$ are independently selected from the group consisting of hydrogen, hydrocarbyls, and substituted hydrocarbyls, (preferably hydrogen and alkyls), and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 1 or 2, and q is 1 or 2;

$R_1$ and $R_{11}$ are independently selected from the group consisting of hydrocarbyls, substituted hydrocarbyls, and silyl groups (preferably alkyl, aryl, heteroaryl, and silyl groups);

$R_2$ and $R_{10}$ are each, independently, —$E(R_{12})(R_{13})$— with E being carbon, silicon, or germanium, and each $R_{12}$ and $R_{13}$ being independently selected from the group consisting of hydrogen, hydrocarbyl, and substituted hydrocarbyl, alkoxy, silyl, amino, aryloxy, halogen, and phosphino (preferably hydrogen, alkyl, aryl, alkoxy, silyl, amino, aryloxy, heteroaryl, halogen, and phosphino), $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;

$R_3$, $R_4$, and $R_5$ are independently selected from the group consisting of hydrogen, hydrocarbyls, substituted hydrocarbyls, alkoxy, aryloxy, halogen, amino, and silyl, (preferably hydrogen, alkyl, alkoxy, aryloxy, halogen, amino, silyl, and aryl), and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3, or 4.

Preferably M is Ti, Zr, or Hf

Preferably, the R groups above and other R groups mentioned hereafter, contain up to 30, preferably no more than 30 carbon atoms, especially from 2 to 20 carbon atoms.

Preferably, the group represented by E is carbon, and $R_1$ and $R_{11}$ are independently selected from phenyl groups that are variously substituted with between zero to five substituents that include F, Cl, Br, I, $CF_3$, $NO_2$, alkoxy, dialkylamino, hydrocarbyl, and substituted hydrocarbyls, groups with from one to ten carbons.

Preferably, the group represented by L is selected from halide, alkyl, aryl, alkoxy, amido, hydrido, phenoxy, hydroxy, silyl, allyl, alkenyl, and alkynyl; and the group represented by L' is selected from ethers, thio-ethers, amines, nitriles, imines, pyridines, and phosphines.

In one preferred embodiment, Z is defined as an aryl so that the complex corresponds to formula (II):

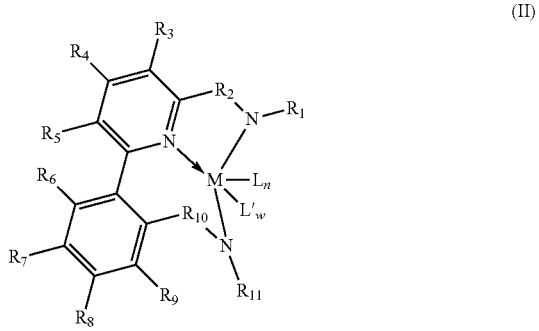

(II)

wherein:
$R_6$, $R_7$, $R_8$, and $R_9$ are independently selected from the group consisting of hydrogen, hydrocarbyls, substituted hydrocarbyls, alkoxy, halogen, amino, and silyl, and the pairs of positions, and wherein adjacent R groups ($R_6$ & $R_7$, and/or $R_7$ & $R_8$, and/or $R_8$ & $R_9$, and/or $R_9$ & $R_{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are as defined above.

In a preferred embodiment, $R_1$ and $R_{11}$ may be independently selected from phenyl groups that are variously substituted with between zero to five substituents that include F, Cl, Br, I, $CF_3$, $NO_2$, alkoxy, dialkylamino, aryl, and alkyl groups with between one to ten carbons.

In a more preferred embodiment, the complexes of this invention are of the formula (III):

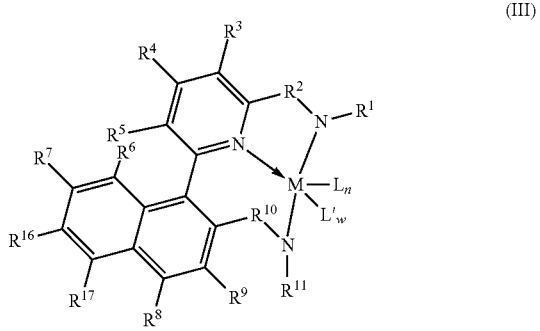

(III)

wherein,
$R^6$, $R^7$, $R^8$, $R^9$, $R^{16}$, and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are defined as above.

In further embodiments, it is preferred that $R^1$ to $R^{13}$ contain up to 30 and no more than 30 carbon atoms, especially from 2 to 20 carbon atoms. $R^1$ and $R^{11}$ substituted on the nitrogen atom are preferably selected from aryl group containing from 6 to 30 carbon atoms, especially phenyl groups. It is preferred that $R^1$ and $R^{11}$ be chosen from aryl or alkyl groups and that $R^{12}$ through $R^{15}$ be independently chosen from hydrogen, alkyl, and aryl groups, such as phenyl. The phenyl groups may be alkyl substituted. The alkyl substituents may be straight chain alkyls but include branched alkyls.

Preferably each $R^1$ and $R^{11}$ are a substituted phenyl group with either one or both of the carbons adjacent to the carbon joined to the amido nitrogen being substituted with an group containing between one to ten carbons. Some specific examples would include $R^1$ and $R^{11}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

$R^2$ is preferably selected from moieties where E is carbon, especially a moiety —C($R_{12}$)($R_{13}$)— where $R^{12}$ is hydrogen and $R^{13}$ is an aryl group or a benzyl group (preferably a phenyl ring linked through an alkylene moiety such as methylene to the C atom). The phenyl group may then be substituted as discussed above. Preferably $R^3$ to $R^9$ are hydrogen or alkyl from 1 to 4 carbon atoms. Preferably 0, 1 or 2 of $R^3$ to $R^9$ are alkyl substituents.

The pyridyldiamido-metal complex (I) is coordinated the metal center as a tridentate ligand through two amido donors and one pyridyl donor. The metal center M is a transition metal from Groups 3 to 12. While in its use as a catalyst, according to current theory M is preferably in its four valent state, it is possible to create compounds in which M has a reduced valency state and regains its formal valency state upon preparation of the catalysts system by contacting with an activator. Preferably in addition to the pyridyldiamido ligand, the metal M is also coordinated to n number of anionic ligands, with n being from 1 to 4. The anionic donors are typically halide or alkyl, but a wide range of other anionic groups are possible including some that are covalently linked together to form molecules that could be considered dianionic, such as oxalate. For certain complexes it is likely that up to three neutral Lewis bases (L'), typically ethers, could also be coordinated to the metal center. In a preferred embodiment w is 0, 1, 2 or 3.

A preferred synthesis of the pyridyldiamido complexes is reaction of the neutral pyridyldiamine ligand precursors with a metalloamide, including $Zr(NMe_2)_4$, $Zr(NEt_2)_4$, $Hf(NMe_2)_4$, and $Hf(NEt_2)_4$. Another preferred synthesis of the pyridyldiamido complexes is the reaction of the neutral pyridyldiamine ligand precursors with an organolithium reagent to form the dilithio pyridyldiamido derivative followed by reaction of this species with either a transition metal salt, including $ZrCl_4$, $HfCl_4$, $ZrCl_4$(1,2-dimethoxyethane), $HfCl_4$(1,2-dimethoxy ethane), $ZrCl_4$(tetrahydrofuran)$_2$, $HfCl_4$(tetrahydrofuran)$_2$, $ZrBn_2Cl_2(OEt_2)$, $HfBn_2Cl_2(OEt_2)$. Another preferred synthesis of the pyridyldiamido complexes is reaction of the neutral pyridyldiamine ligand precursors with an organometallic reactant, including $ZrBn_4$, $ZrBn_2Cl_2(OEt_2)$, $Zr(CH_2SiMe_3)_4$, $Zr(CH_2CMe_3)_4$, $HfBn_4$, $HfBn_2Cl_2(OEt_2)$, $Hf(CH_2SiMe_3)_4$, $Hf(CH_2CMe_3)_4$.

These complexes may be used in combination with appropriate activators for olefin polymerization such as ethylene-based polymers or propylene-based polymers, including ethylene-hexene polymerization.

Activators

The supported catalyst systems may be formed by combining the pyridyldiamido transition metal complex with activators in any manner known from the literature including by supporting them for use in slurry or gas phase polymerization. The catalyst system typically comprises a complex as described above and an activator such as alumoxane or a non-coordinating anion. Activators are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

Alumoxane Activators

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When an alumoxane or modified alumoxane is used, the complex-to-activator molar ratio is from about 1:3000 to 10:1; alternatively 1:2000 to 10:1; alternatively 1:1000 to 10:1; alternatively 1:500 to 1:1; alternatively 1:300 to 1:1; alternatively 1:200 to 1:1; alternatively 1:100 to 1:1; alternatively 1:50 to 1:1; and alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

The catalyst systems of this invention can include at least one non-coordinating anion (NCA) activator. Specifically, the catalyst systems include NCAs, which either do not coordinate to a cation or which only weakly coordinate to a cation thereby remaining sufficiently labile to be displaced during polymerization.

The terms "cocatalyst" and "activator" are used herein interchangeably and are defined to be any compound which can activate any one of the catalyst compounds described above by converting the neutral catalyst compound to a catalytically active catalyst compound cation.

In a preferred embodiment boron containing NCA activators represented by the formula below can be used:

where: Z is (L-H) or a reducible Lewis acid; L is a neutral Lewis base; H is hydrogen; (L-H) is a Bronsted acid; $A^{d-}$ is a boron-containing non-coordinating anion having the charge d–; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted C1 to C40 hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]d^-$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorided hydrocarbyl group having 1 to 20 carbon atoms, more preferably each Q is a fluorided aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Ser. No. 61/494,730, filed Jun. 8, 2011, which is incorporated by reference herein.

Most preferably, the ionic stoichiometric activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

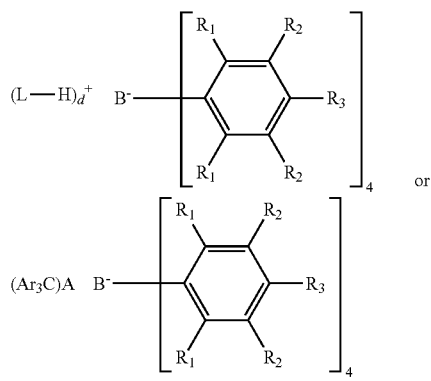

where:
each $R_1$ is, independently, a halide, preferably a fluoride;
Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_1$, where $R_a$ is a $C_1$ to $C_{20}$ hydrocarbyl or hydrocarbylsilyl group (preferably $R_2$ is a fluoride or a perfluorided phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorided aromatic hydrocarbyl group); wherein $R_2$ and $R_3$ can form one or more saturated or unsaturated, substituted or unsubstituted rings (preferably $R_2$ and $R_3$ form a perfluorided phenyl ring); and
L is an neutral Lewis base; (L-H)$^+$ is a Bronsted acid; d is 1, 2, or 3;
wherein the anion has a molecular weight of greater than 1020 g/mol;
wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4$$^-$], [Me$_3$NH$^+$][B(C$_6$F$_5$)$_4$$^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

When an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; and 1:1 to 1:1.2.

It is also within the scope of this invention that the catalyst compounds can be combined with combinations of alumoxanes and NCA's (see, for example, U.S. Pat. No. 5,153,157; 5,453,410; EP 0 573 120 B1; WO 94/07928; and WO 95/14044; which discuss the use of an alumoxane in combination with an ionizing activator).

Scavengers

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers useful in the invention include those where there is an oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_z\text{—}Al\text{—})_y O\text{—})_x$, wherein z is 1-2, y is 1-2, x is 1-100, and R is a $C_1$-$C_{12}$ hydrocarbyl group. In another aspect, the scavenger has an oxygen-to-aluminum (O/Al) molar ratio of from about 0.25 to about 1.5, more particularly from about 0.5 to about 1.

Support Material

In embodiments of the invention herein, the catalyst systems comprise a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2$/$Al_2O_3$.

It is preferred that the support material, most preferably an inorganic oxide, has a surface area in the range of from about 10 $m^2$/g to about 700 $m^2$/g, pore volume in the range of from about 0.1 cc/g to about 4.0 cc/g, and average particle size in the range of from about 5 μm to about 500 μm. More preferably, the surface area of the support material is in the range of from about 50 $m^2$/g to about 500 $m^2$/g, pore volume of from about 0.5 cc/g to about 3.5 cc/g, and average particle size of from about 10 μm to about 200 μm. Most preferably, the surface area of the support material is in the range of from about 100 $m^2$/g to about 400 $m^2$/g, pore volume from about 0.8 cc/g to about 3.0 cc/g, and average particle size is from about 5 μm to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area≥300 $m^2$/gm, pore volume≥1.65 $cm^3$/gm), and is marketed under the trade names of DAVISON 952 or DAVISON 955 by the Davison Chemical Division of W. R. Grace and Company, are particularly useful. In other embodiments, DAVIDSON 948 is used.

In some embodiments of this invention, the support material may be dry, that is, free of absorbed water. Drying of the support material can be achieved by heating or calcining at about 100° C. to about 1000° C., preferably at least about 600° C. When the support material is silica, it is typically heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material preferably has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support material with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternately 0.19 to 19 wt %, alternately from 0.6 to 3.5 wt %, based upon the weight of the support.

The catalyst complexes described herein are generally deposited on the support material at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

Polymerization Process

In embodiments herein, the invention relates to polymerization processes where monomer (such as ethylene), and optionally comonomer (such as hexene), are contacted with a supported catalyst system comprising a pyridyldiamido transition metal complex, an activator, a support material as described above. The pyridyldiamido transition metal complex, activator and support material may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomers comprise ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadecene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In a preferred embodiment one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment the process of the invention relates to the polymerization of ethylene and at least one comonomer having from 3 to 8 carbon atoms, preferably 4 to 8 carbon atoms. Particularly, the comonomers are propylene, butene-1,4-methyl-pentene-1,3-methylpentene-1, hexene-1 and octene-1, the most preferred being hexene-1, butene-1 and octene-1.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry phase polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt %, based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired polymers. The present polymerization processes may be conducted under conditions preferably including a temperature of about 30° C. to about 200° C., preferably from 60° C. to 195° C., preferably from 75° C. to 190° C. The process may be conducted at a pressure of from 0.05 MPa to 1500 MPa. In a preferred embodiment, the pressure is between 1.7 MPa and 30 MPa, or in another embodiment, especially under supercritical conditions, the pressure is between 15 MPa and 1500 MPa.

In a typical polymerization, the run time of the reaction is up to 300 minutes, preferably in the range of from about 5 to 250 minutes, or preferably from about 10 to 120 minutes.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the activity of the catalyst is at least 50 kg/mol/hour, preferably 500 or more kg/mol/hr, preferably 5000 or more kg/mol/hr, preferably 50,000 or more kg/mol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no scavenger is used in the process to produce the ethylene polymer. Preferably, scavenger (such as tri-alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) the polymerization preferably occurs in one reaction zone; and 5) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)).

A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is well known in the art, and described in, for instance, U.S. Pat. No. 3,248,179, which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor may be maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Polyolefin Products

The supported catalyst systems can be used to produce ultrahigh molecular weight polyolefins (generally referring polyolefins varying a Mw greater than 1,000,000 g/mol), though the molecular weight of the polymers produced herein is influenced by reactor conditions including temperature, monomer concentration and pressure, the presence of chain terminating agents and the like. The homopolymer and copolymer products produced by the present process may have an Mw of about 1,000 to about 10,000,000 g/mol, alternately of about 1,000,000 to about 5,000,000 g/mol, or alternately of about 2,000,000 to about 3,000,000 g/mol, as determined by GPC. Preferred polymers produced here may be homopolymers or copolymers. In a preferred embodiment, the comonomer(s) are present at up to 50 mol %, preferably from 0.01 to 40 mol %, preferably 1 to 30 mol %, preferably from 5 to 20 mol %.

In some embodiments herein, a multimodal polyolefin composition is produced, comprising a first polyolefin component and at least another polyolefin component, different from the first polyolefin component by molecular weight, preferably such that the GPC trace has more than one peak or inflection point.

Measurements of weight average molecular weight (Mw), number average molecular weight (Mn), and z average molecular weight (Mz) are determined by Gel Permeation Chromatography (GPC) as described in Macromolecules, 2001, Vol. 34, No. 19, pg. 6812, which is fully incorporated herein by reference, including that, a High Temperature Size Exclusion Chromatograph (SEC, Waters Alliance 2000), equipped with a differential refractive index detector (DRI) equipped with three Polymer Laboratories PL gel 10 mm Mixed-B columns is used. The instrument is operated with a flow rate of 1.0 cm$^3$/min, and an injection volume of 300 μL. The various transfer lines, columns and differential refractometer (the DRI detector) are housed in an oven maintained at 145° C. Polymer solutions are prepared by heating 0.75 to 1.5 mg/mL of polymer in filtered 1,2,4-(TCB) containing ~1000 ppm of butylated hydroxy toluene (BHT) at 160° C. for 2 hours with continuous agitation. A sample of the polymer-containing solution is injected into the GPC and eluted using filtered 1,2,4-trichlorobenzene (TCB) containing ~1000 ppm of BHT. The separation efficiency of the column set is calibrated using a series of narrow MWD polystyrene standards reflecting the expected Mw range of the sample being analyzed and the exclusion limits of the column set. Seventeen individual polystyrene standards, obtained from Polymer Laboratories (Amherst, Mass.) and ranging from Peak Molecular Weight (Mp) ~580 to 10,000,000, were used to generate the calibration curve. The flow rate is calibrated for each run to give a common peak position for a flow rate marker (taken to be the positive inject peak) before determining the retention volume for each polystyrene standard. The flow marker peak position is used to correct the flow rate when analyzing samples. A calibration curve (log(Mp) vs. retention volume) is generated by recording the retention volume at the peak in the DRI signal for each PS standard, and fitting this data set to a 2nd-order polynomial. The equivalent polyethylene molecular weights are determined by using the Mark-Houwink coefficients shown in Table B.

TABLE B

| Mark-Houwink coefficients | | |
|---|---|---|
| Material | K (dL/g) | α |
| PS | $1.75 \times 10^{-4}$ | 0.67 |
| PE | $5.79 \times 10^{-4}$ | 0.695 |

End Uses

Articles made using polymers produced herein may include, for example, molded articles (such as containers and bottles, e.g. household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

Now, having described the various features of the supported catalyst system and process of using the catalyst system in making polyolefins, described here in numbered paragraphs is:

1. A supported catalyst system comprising:
   (i) a pyridyldiamido transition metal complex having the general formula (I);

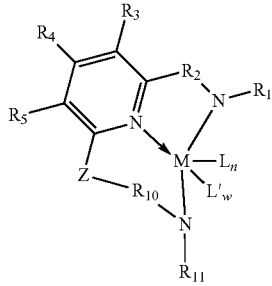

(ii) an activator; and
   (iii) a support material;
wherein:
M is a Group 3, 4, 5, 6, 7, 8, 9, 10, 11 or 12 metal;
Z is —$(R_{14})_pC$—$C(R_{15})_q$—,
   where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings,
   p is 0, 1 or 2, and
   q is 0, 1 or 2;
$R_1$ and $R_{11}$ are independently selected from the group consisting of hydrocarbyls, substituted hydrocarbyls, and silyl groups;
$R_2$ and $R_{10}$ are each, independently, —$E(R_{12})(R_{13})$— with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;
$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;
L is an anionic leaving group, where the L groups may be the same or different and any two L groups may be linked to form a dianionic leaving group;
n is 0, 1, 2, 3, or 4;
L' is neutral Lewis base; and
w is 0, 1, 2, 3 or 4.
2. A supported catalyst system according to paragraph 1, wherein the pyridyldiamido transition metal complex is represented by the formula (II):

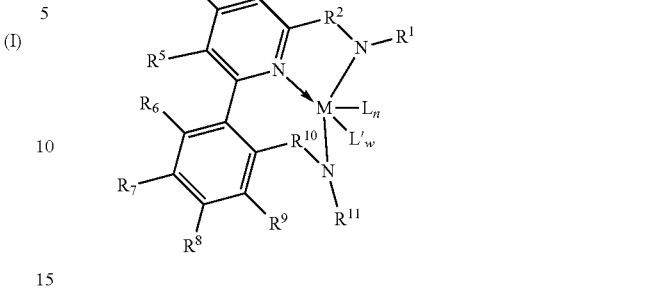

wherein
$R_6$, $R_7$, $R_8$, and $R_9$ are independently selected from the group consisting of hydrogen, hydrocarbyls, substituted hydrocarbyls, alkoxy, halogen, amino, and silyl, and the pairs of positions, and wherein adjacent R groups ($R_6$ & $R_7$, and/or $R_7$ & $R_8$, and/or $R_8$ & $R_9$, and/or $R_9$ & $R_{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are as defined in paragraph 1.
3. A supported catalyst system according to the preceding paragraphs 1 to 2, wherein the pyridyldiamido transition metal complex is represented by the formula (III):

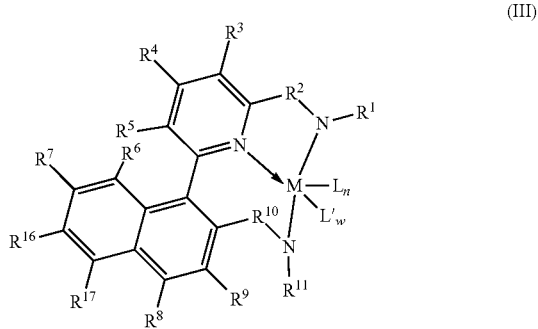

wherein
$R^6$, $R^7$, $R^8$, $R^9$, $R^{16}$, and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are as defined in paragraph 1.
4. A supported catalyst system according to the preceding paragraphs 1 to 3, wherein the metal represented by M comprises Ti, Zr, or Hf.
5. A supported catalyst system according to the preceding paragraphs 1 to 4, wherein the groups represented by $R_1$, $R_3$ to $R_9$, or $R_{11}$ to $R_{15}$ contain 2 to 20 carbon atoms.
6. A supported catalyst system according to the preceding paragraphs 1 to 5, wherein the group represented by E is carbon, and $R_1$ and $R_{11}$ are independently selected from phenyl groups that are variously substituted with between zero to five substituents that include F, Cl, Br, I, $CF_3$, $NO_2$, alkoxy, dialkylamino, hydrocarbyl, and substituted hydrocarbyls, groups with from one to ten carbons.

7. A supported catalyst system according to the preceding paragraphs 1 to 6, wherein the group represented by L is selected from halide, alkyl, aryl, alkoxy, amido, hydrido, phenoxy, hydroxy, silyl, allyl, alkenyl, and alkynyl; and the group represented by L' is selected from ethers, thio-ethers, amines, nitriles, imines, pyridines, and phosphines.

8. A supported catalyst system according to the preceding paragraphs 1 to 7, wherein the support material has a surface area in the range of from 10 to 700 m$^2$/g and an average particle diameter in the range of from 10 to 500 µm.

9. A supported catalyst system according to the preceding paragraphs 1 to 8, wherein the support material is selected from the group consisting of silica, alumina, silica-alumina, and combinations thereof.

10. A supported catalyst system according to the preceding paragraphs 1 to 9, wherein the support material is fluorided.

11. A supported catalyst system according to the preceding paragraphs 1 to 10, wherein the support material has a fluorine concentration in the range of 0.6 to 3.5 wt %, based upon the weight of the support material.

12. A supported catalyst system according to the preceding paragraphs 1 to 11, wherein the support material comprises fluorided silica.

13. A process for polymerization of olefin monomers comprising: contacting one or more monomers with a supported catalyst system, wherein the supported catalyst system comprises:

(i) a pyridyldiamido transition metal complex having the general formula (I);

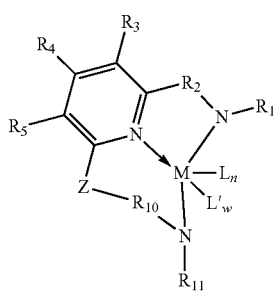
(I)

(ii) an activator; and
(iii) a support material;

wherein:

M is a Group 3, 4, 5, 6, 7, 8, 9, 10, 11 or 12 metal;

Z is —(R$_{14}$)$_p$C—C(R$_{15}$)$_q$—,
  where R$_{14}$ and R$_{15}$ are independently selected from the group consisting of hydrogen, hydrocarbyls, and substituted hydrocarbyls, and wherein adjacent R$_{14}$ and R$_{15}$ groups may be joined to form an aromatic or saturated, substituted or unsubstituted hydrocarbyl ring, where the ring has 5, 6, 7, or 8 ring carbon atoms and where substitutions on the ring can join to form additional rings,
  p is 0, 1 or 2, and
  q is 0, 1 or 2;

R$_1$ and R$_{11}$ are independently selected from the group consisting of hydrocarbyls, substituted hydrocarbyls, and silyl groups;

R$_2$ and R$_{10}$ are each, independently, —E(R$_{12}$)(R$_{13}$)— with E being carbon, silicon, or germanium, and each R$_{12}$ and R$_{13}$ being independently selected from the group consisting of hydrogen, hydrocarbyls, alkoxy, silyl, amino, aryloxy, substituted hydrocarbyls, halogen, and phosphino, R$_{12}$ and R$_{13}$ may be joined to each other or to R$_{14}$ or R$_{15}$ to form a saturated, substituted or unsubstituted hydrocarbyl ring, where the ring has 4, 5, 6, or 7 ring carbon atoms and where substitutions on the ring can join to form additional rings, or R$_{12}$ and R$_{13}$ may be joined to form a saturated heterocyclic ring, or a saturated substituted heterocyclic ring where substitutions on the ring can join to form additional rings;

R$_3$, R$_4$, and R$_5$ are independently selected from the group consisting of hydrogen, hydrocarbyls, substituted hydrocarbyls, alkoxy, aryloxy, halogen, amino, and silyl, and wherein adjacent R groups (R$_3$ & R$_4$, and/or R$_4$ & R$_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

14. A process according to paragraph 13, wherein the pyridyldiamido transition metal complex is represented by the formula (II):

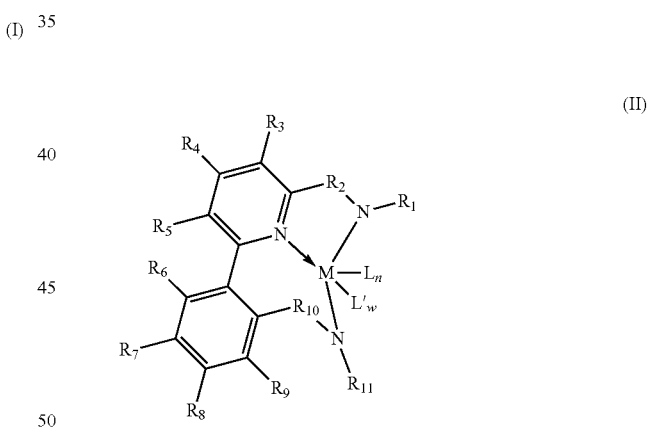
(II)

wherein

R$_6$, R$_7$, R$_8$, and R$_9$ are independently selected from the group consisting of hydrogen, hydrocarbyls, substituted hydrocarbyls, alkoxy, halogen, amino, and silyl, and the pairs of positions, and wherein adjacent R groups (R$_6$ & R$_7$, and/or R$_7$ & R$_8$, and/or R$_8$ & R$_9$, and/or R$_9$ & R$_{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, R$_1$, R$_2$, R$_3$, R$_4$, R$_5$, R$_{10}$ and R$_{11}$ are as defined in paragraph 13.

15. A process according to the preceding paragraphs 13 to 14, wherein the pyridyldiamido transition metal complex is represented by the formula (III):

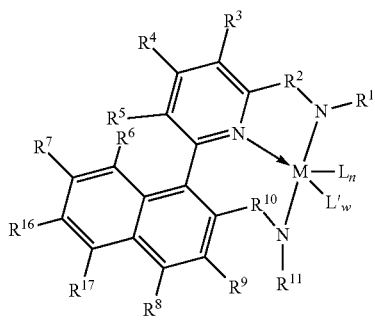

(III)

wherein
$R^6$, $R^7$, $R^8$, $R^9$, $R^{16}$, and $R^{17}$ and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are as defined in paragraph 13.

16. A process according to the preceding paragraphs 13 to 15, wherein the metal represented by M comprises Ti, Zr, or Hf.

17. A process according to the preceding paragraphs 13 to 16, wherein the support material has a surface area in the range of from 10 to 700 m²/g and an average particle diameter in the range of from 10 to 500 μm.

18. A process according to the preceding paragraphs 13 to 17, wherein the support material is selected from the group consisting of silica, alumina, silica-alumina, and combinations thereof.

19. A process according to the preceding paragraphs 13 to 18, wherein the support material is fluorided.

20. A process according to the preceding paragraphs 13 to 19, wherein the support material has a fluorine concentration in the range of 0.6 to 3.5 wt %, based upon the weight of the support.

21. A process according to the preceding paragraphs 13 to 20, wherein the support material comprises fluorided silica.

22. A process according to the preceding paragraphs 13 to 21, wherein the olefin monomer is selected from the group consisting of ethylene, propylene, 1-hexene, 1-octene and combinations thereof.

23. A process according to the preceding paragraphs 13 to 22, wherein the polymerization is carried out in slurry.

24. An ultra-high molecular weight polyolefin catalyzed by the supported catalyst system according to the preceding paragraphs 1-12, wherein the weight average molecular weight of the polyolefin is greater than 3,000,000 g/mol.

EXAMPLES

General Synthesis of Pyridyldiamines

Outlined in Scheme 1 is the general synthetic route that was used to prepare the pyridyldiamines used herein with the exception of those listed above. In the Scheme, pin is pinacolate (2,3-dimethylbutane-2,3-diolate), Me is methyl, Dipp is 2,6-diisopropylphenyl. A detailed procedure is presented for the preparation of pyridyldiamine 6a. The pyridyldiamines 6b, 6e, 6f, 6g, 6h, 6i, 6j were prepared and isolated analogously to 6a and only characterization data are presented.

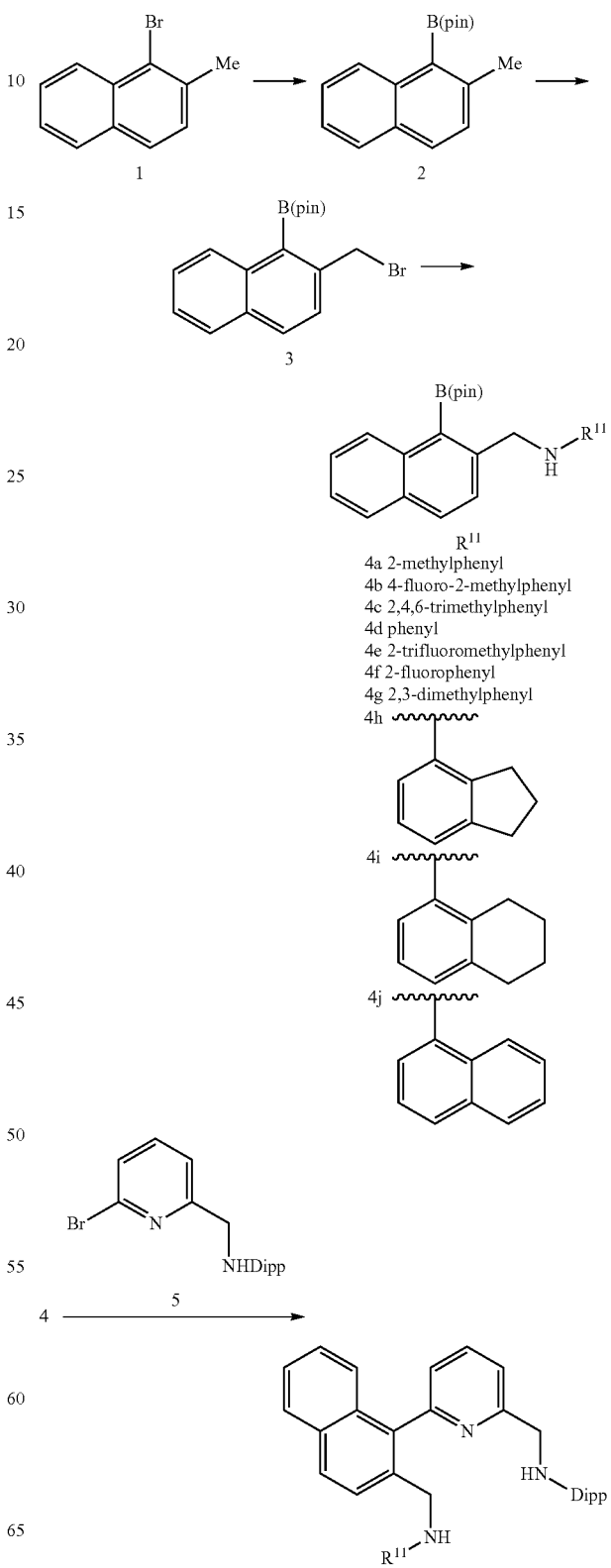

-continued

R[11]
6a 2-methylphenyl
6b 4-fluoro-2-methylphenyl
6c 2,4,6-trimethylphenyl
6d phenyl
6e 2-trifluoromethylphenyl
6f 2-fluorophenyl
6g 2,3-dimethylphenyl
6h

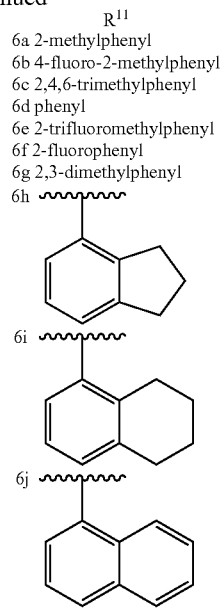

6i

6j

4,4,5,5-Tetramethyl-2-(2-methyl-1-naphthyl)-1,3,2-dioxaborolane (2)

1,2-Dibromoethane (~0.3 ml) was added to 6.10 g (250 mmol) magnesium turnings in 1000 cm³ of THF. This mixture was stirred for 10 min, and then 55.3 g (250 mmol) of 1-bromo-2-methylnaphthalene was added for 1 h by vigorous stirring at room temperature for 3.5 h. Thereafter, 46.5 g (250 mmol) of 2-isopropoxy-4,4,5,5-tetramethyl-1,3,2-dioxaborolane was added in one portion. The resulting mixture was stirred for 15 minutes and then was poured into 1000 cm³ of cold water. The product was extracted with 3×300 ml of ethyl acetate. The organic layer was separated, washed by water, brine, then dried over $MgSO_4$, and, finally, evaporated to dryness. The resulting white solid was washed by 2×75 ml of pentane and dried in vacuum. Yield 47.3 g (70%). Anal. calc. for $C_{17}H_{21}BO_2$: C, 76.14; H, 7.89. Found: C, 76.31; H, 8.02. $^1$H NMR (CDCl$_3$): 8.12 (m, 1H, 8-H), 7.77 (m, 1H, 5-H), 7.75 (d, J=8.4 Hz, 1H, 4-H), 7.44 (m, 1H, 7-H), 7.38 (m, 1H, 6-H), 7.28 (d, J=8.4 Hz, 1H, 3-H), 2.63 (s, 3H, 2-Me), 1.48 (s, 12H, CMe$_2$CMe$_2$).

2-[2-(Bromomethyl)-1-naphthyl]-4,4,5,5-tetramethyl-1,3,2-dioxaborolane (3)

A mixture of 47.3 g (176 mmol) of 4,4,5,5-tetramethyl-2-(2-methyl-1-naphthyl)-1,3,2-dioxaborolane, 33.0 g (185 mmol) of NBS (N-Bromosuccinimide) and 0.17 g of benzoyl peroxide in 340 ml of CCl$_4$ was stirred at 75° C. for 14 h. Thereafter the reaction mixture was cooled to room temperature, filtered through glass frit (G3), and the filtrate was evaporated to dryness. This procedure gave 62.2 g (99%) of beige solid. Anal. calc. for $C_{17}H_{20}BBrO_2$: C, 58.83; H, 5.81. Found: C, 59.00; H, 5.95. $^1$H NMR (CDCl$_3$): 8.30 (m, 1H, 8-H), 7.84 (d, J=8.3 Hz, 1H, 4-H), 7.79 (m, 1H, 5-H), 7.43-7.52 (m, 3H, 3,6,7-H), 4.96 (s, 2H, CH$_2$Br), 1.51 (s, 12H, CMe$_2$CMe$_2$).

2-Methyl-N-((1-(4,4,5,5-tetramethyl-1,3,2-dioxaborolan-2-yl)naphthalen-2-yl)methyl)aniline (4a)

A mixture of 10.8 g (101 mmol) of 2-methylaniline, 23.3 g (67.0 mmol) of 2-[2-(bromomethyl)-1-naphthyl]-4,4,5,5-tetramethyl-1,3,2-dioxaborolane (compound 3), and 10.2 g (74.0 mmol) of K$_2$CO$_3$ in 450 mL of DMF was stirred for 12 h at 80° C. The resulting mixture was poured into 1000 mL of water. The product was extracted with 3×200 ml of ethyl acetate. The combined extract was dried over MgSO$_4$ and then evaporated to dryness. The residue was re-crystallized from a mixture of 200 ml of hexane and 10 ml of ethyl acetate. Yield 15.7 g (63%) of a brown crystalline powder. Anal. calc. for $C_{24}H_{28}BNO_2$: C, 77.22; H, 7.56; N, 3.75. Found: C, 77.33; H, 7.67; N, 3.59. $^1$H NMR (CDCl$_3$): δ 8.20 (m, 1H, 8-H in naphthyl), 7.84 (d, J=8.5 Hz, 1H, 4-H in naphthyl), 7.82 (m, 1H, 5-H in naphthyl), 7.43-7.52 (m, 3H, 3,6,7-H in naphthyl), 7.14 (m, 1H, 5-H in o-tolyl), 7.06 (m, 1H, 3-H in o-tolyl), 6.79 (m, 1H, 6-H in o-tolyl), 6.68 (m, 1H, 4-H in o-tolyl), 4.53 (s, 2H, CH$_2$N), 3.95 (br.s, 1H, NH), 2.11 (s, 3H, 2-Me in o-tolyl), 1.36 (s, 12H, CMe2CMe2).

N-[(6-Bromopyridin-2-yl)methyl]-2,6-diisopropylaniline (5)

A mixture of 25.0 g (134 mmol) of 6-bromopyridine-2-carbaldehyde, 23.8 g (134 mmol) of 2,6-diisopropylaniline and 1.15 g (6.70 mmol) of TsOH in 600 ml of toluene was refluxed for 15 min using a Soxhlet apparatus filled with CaCl$_2$. The obtained solution was evaporated to dryness, and the residue was re-crystallized from 100 ml of methanol to give the imine product N-[(1E)-(6-bromopyridin-2-yl)methylene]-2,6-diisopropylaniline as a yellow crystalline solid (23.9 g). In argon atmosphere, a mixture of 22.4 g (65.0 mmol) of N-[(1E)-(6-bromopyridin-2-yl)methylene]-2,6-diisopropylaniline, 6.53 g (104 mmol) of NaBH$_3$CN, 2 ml of AcOH and 430 ml of methanol was refluxed for 12 h. The obtained mixture was cooled, poured into 1000 ml of water, and then extracted with 3×200 ml of ethyl acetate. The combined extract was dried over MgSO$_4$ and evaporated to dryness. The residue was purified by flash chromatography on silica gel 60 (40-63 μm, eluent: hexane-ethyl acetate=10:1, vol.). Yield 19.8 g (43%) of a yellow oil. Anal. calc. for $C_{18}H_{23}BrN_2$: C, 62.25; H, 6.68; N, 8.07. Found: C, 62.40; H, 6.77; N, 7.96. $^1$H NMR (CDCl$_3$): δ 7.50 (m, 1H, 4-H in 6-bromopyridyl), 7.38 (m, 1H, 5-H in 6-bromopyridyl), 7.28 (m, 1H, 3-H in 6-bromopyridyl), 7.01-7.11 (m, 3H, 3,4,5-H in 2,6-diisopropylphenyl), 4.16 (s, 2H, CH$_2$N), 3.93 (br.s, 1H, NH), 3.31 (sep, J=6.9 Hz, 2H, CHMe$_2$), 1.22 (d, J=6.9 Hz, 12H, CHMe$_2$).

2,6-Diisopropyl-N-{[6-(2{[(2-methylphenyl)amino]methyl}-1-naphthyl)pyridin-2-yl]methyl}aniline (6a)

A mixture of 27.2 g (95.0 mmol) of Na$_2$CO$_3$×10H$_2$O, 410 ml of water and 120 ml of methanol was purged with argon for 30 min. The obtained solution was added to a mixture of 14.2 g (38.0 mmol) of 2-methyl-N-{[1-(4,4,5,5-tetramethyl-1,3,2-dioxaborolan-2-yl)-2-naphthyl]methyl}aniline (4a), 13.3 g (38.0 mmol) of N-[6-bromopyridin-2-yl)methyl]-2,6-diisopropylaniline, and 2.19 g (1.90 mmol) of Pd(PPh$_3$)$_4$ in 500 ml of toluene. This mixture was stirred for 12 h at 70° C., then cooled to room temperature. The organic layer was separated; the aqueous layer was extracted with 3×200 ml of ethyl acetate. The combined organic extract was washed with brine, dried over Na$_2$SO$_4$ and evaporated to dryness. The residue was purified by flash chromatography on silica gel 60 (40-63 μm, eluent: hexane-ethyl acetate-triethylamine=100:20:1, vol.). Yield 10.1 g (52%) of a yellow powder. Anal. calc. for $C_{36}H_{39}N_3$: C, 84.17; H, 7.65; N, 8.18. Found: C, 84.28; H, 7.73; N, 8.09. $^1$H NMR (CDCl$_3$): δ 7.91 (d, J=8.4 Hz, 1H, 4-H in naphthyl), 7.89 (m, 1H, 8-H in naphthyl), 7.79 (m, 1H, 4-H in Py), 7.66 (d, J=8.4 Hz, 1H, 3-H in naphthyl), 7.47 (m, 1H, 7-H in naphthyl), 7.36-7.42 (m, 4H, 3,5-H in Py and 5,6-H in naphthyl), 7.04-7.10 (m, 3H, 3,5-H in ortho-tolyl and 4-H in 2,6-diisopropylphenyl), 7.01 (m, 2H, 3,5-H in 2,6-diisopropylphenyl), 6.61 (m, 1H, 4-H in ortho-tolyl), 6.52 (m, 1H, 6-H in ortho-tolyl), 4.22-4.35 (m, 4H, CH$_2$N), 4.02 (br.s, 1H, NH), 3.93 (br.s, 1H, NH), 3.28 (sept, J=6.8 Hz, 2H, CHMe$_2$), 2.09 (s, 3H, Me in ortho-tolyl), 1.16 (d, J=6.8 Hz, 6H, CHMeMe'), 1.14 (d, J=6.8 Hz, 6H, CHMeMe').

N-{[1-(6-{[(2,6-Diisopropylphenyl)amino]methyl}pyridin-2-yl)-2-naphthyl]methyl}-4-fluoro-2-methylaniline (6b)

Anal. calc. for C$_{36}$H$_{38}$FN$_3$: C, 81.32; H, 7.20; N, 7.90. Found: C, 80.98; H, 7.14; N, 7.82.

$^1$H NMR (CDCl$_3$): δ 7.91 (d, J=8.5 Hz, 1H), 7.89 (m, 1H), 7.80 (m, 1H), 7.64 (d, J=8.5 Hz, 1H), 7.35-7.50 (m, 5H), 7.03-7.11 (m, 3H), 6.75 (m, 1H), 6.71 (m, 1H), 6.42 (dd, J=8.7 Hz, J=4.6 Hz, 1H), 4.28 (m, 2H), 4.20 (m, 2H), 3.97 (br.s, 1H), 3.89 (br.s, 1H), 3.26 (sept, J=6.8 Hz), 2.08 (s, 3H), 1.16 (d, J=6.9 Hz, 6H), 1.15 (d, J=6.9 Hz, 6H).

2,6-Diisopropyl-N-({6-[2({[2-(trifluoromethyl)phenyl]amino}methyl)-1-naphthyl]Pyridin-yl}methyl)aniline (6e)

Anal. calc. for C$_{36}$H$_{36}$F$_3$N$_3$: C, 76.17; H, 6.39; N, 7.40. Found: C, 75.92; H, 6.30; N, 7.24.

$^1$H NMR (CDCl$_3$): δ 7.92 (d, J=8.6 Hz, 1H), 7.89 (m, 1H), 7.82 (m, 1H), 7.64 (d, J=8.6 Hz, 1H), 7.36-7.51 (m, 6H), 7.24 (m, 1H), 7.04-7.12 (m, 3H), 6.68 (m, 1H), 6.64 (m, 1H), 4.80 (m, 1H), 4.26-4.39 (m, 4H), 4.11 (br.s, 1H), 3.31 (sept, J=6.75 Hz, 2H), 1.17 (d, J=6.8 Hz, 6H), 1.16 (d, J=6.8 Hz, 6H).

N-{[6-(2-{[(2-Fluorophenyl)amino]methyl}-1-naphthyl)pyridin-2-yl]methyl}-2,6-diisopropylaniline (6f)

Anal. calc. for C$_{35}$H$_{36}$FN$_3$: C, 81.20; H, 7.01; N, 8.12. Found: C, 80.98; H, 7.16; N, 8.30.

$^1$H NMR (CDCl$_3$): δ 7.91 (d, J=8.4 Hz, 1H), 7.89 (m, 1H), 7.81 (m, 1H), 7.67 (d, J=8.4 Hz, 1H), 7.45-7.50 (m, 2H), 7.35-7.42 (m, 3H), 7.04-7.12 (m, 3H), 6.87-6.95 (m, 2H), 6.54-6.64 (m, 2H), 4.40 (br.s, 2H), 4.31 (m, 2H), 4.27 (m, 2H), 3.30 (sept, J=6.8 Hz, 2H), 1.17 (d, J=6.8 Hz, 6H), 1.16 (d, J=6.8 Hz, 6H).

N-{[1-(6-{[(2,6-Diisopropylphenyl)amino]methyl}pyridin-2-yl)-2-naphthyl]methyl}-2,3-dimethylaniline (6g)

Anal. calc. for C$_{37}$H$_{41}$N$_3$: C, 84.21; H, 7.83; N, 7.96. Found: C, 84.37; H, 7.99; N, 7.89.

$^1$H NMR (CDCl$_3$): δ 7.91 (d, J=8.2 Hz, 1H, 4-H in naphthyl), 7.89 (m, 1H, 8-H in naphthyl), 7.79 (m, 1H, 4-H in Py), 7.67 (d, J=8.6 Hz, 1H, 3-H in naphthyl), 7.48 (m, 1H, 7-H in naphthyl), 7.37-7.45 (m, 4H, 3,5-H in Py and 5,6-H in naphthyl), 7.04-7.11 (m, 3H, 3,4,5-H in 2,6-diisopropylphenyl), 6.93 (m, 1H, 5-H in 2,3-dimethylphenyl), 6.56 (m, 1H, 4-H in 2,3-dimethylphenyl), 6.44 (m, 1H, 6-H in 2,3-dimethylphenyl), 4.23-4.36 (m, 4H, 2,3-dimethylphenyl-NHCH$_2$ and 2,6-diisopropylphenyl-NHCH$_2$), 4.02 (br.s, 1H, NH), 3.98 (br.s, 1H, NH), 3.29 (sept, J=6.8 Hz, 2H, CHMe$_2$), 2.24 (s, 3H, 3-Me in 2,3-dimethylphenyl), 2.01 (s, 3H, 2-Me in 2,3-dimethylphenyl), 1.17 (d, J=6.8 Hz, 6H, CHMCMe'), 1.15 (d, J=6.8 Hz, 6H, CHMeMe').

N-{[1-(6-{[(2,6-Diisopropylphenyl)amino]methyl}pyridin-2-yl)-2-naphthyl]methyl}indan-4-amine (6h)

Anal. calc. for C$_{38}$H$_{41}$N$_3$: C, 84.56; H, 7.66; N, 7.79. Found: C, 84.49; H, 7.75; N, 7.62.

$^1$H NMR (CDCl$_3$): δ 7.90 (d, J=8.5 Hz, 1H, 4-H in naphthyl), 7.88 (m, 1H, 8-H in naphthyl), 7.79 (m, 1H, 4-H in Py), 7.67 (d, J=8.5 Hz, 1H, 3-H in naphthyl), 7.35-7.49 (m, 5H, 3,5-H in Py and 5,6,7-H in naphthyl), 7.03-7.10 (m, 3H, 3,4,5-H in 2,6-diisopropylphenyl), 6.97 (m, 1H, 3-H in indanyl), 6.60 (m, 1H, 4-H in indanyl), 6.35 (m, 1H, 2-H in indanyl), 4.21-4.36 (m, 4H, indanyl-NHCH$_2$ and 2,6-diisopropylphenyl-NHCH$_2$), 4.04 (br.s, 1H, NH), 3.88 (br.s, 1H, NH), 3.28 (sept, J=6.8 Hz, 2H, CHMe$_2$), 2.86 (m, 2H, 5,5'-H in indanyl), 2.62 (m, 2H, 7,7'-H in indanyl), 2.03 (m, 2H, 6,6'-H in indanyl), 1.15 (d, J=6.8 Hz, 6H, CHMeMe'), 1.14 (d, J=6.8 Hz, 6H, CHMeMe').

N-{[1-(6-{[(2,6-Diisopropylphenyl)amino]methyl}pyridin-2-yl)-2-naphthyl]methyl}-5,6,7,8-tetrahydronaphthalen-1-amine (6i)

Anal. calc. for C$_{39}$H$_{43}$N$_3$: C, 84.59; H, 7.83; N, 7.59. Found: C, 84.44; H, 7.69; N, 7.65.

$^1$H NMR (CDCl$_3$): δ 7.90 (d, J=8.4 Hz, 1H, 4-H in naphthyl), 7.88 (m, 1H, 8-H in naphthyl), 7.78 (m, 1H, 4-H in Py), 7.66 (d, J=8.4 Hz, 1H, 3-H in naphthyl), 7.36-7.49 (m, 5H, 3,5-H in Py and 5,6,7-H in naphthyl), 7.02-7.10 (m, 3H, 3,4,5-H in 2,6-diisopropylphenyl), 6.93 (m, 1H, 3-H in tetrahydronaphthyl), 6.46 (m, 1H, 4-H in tetrahydronaphthyl), 6.37 (m, 1H, 2-H in tetrahydronaphthyl), 4.22-4.36 (m, 4H, tetrahydronaphthyl-NHCH$_2$ and 2,6-diisopropylphenyl-NHCH$_2$), 4.06 (br.s, 1H, NH), 3.91 (br.s, 1H, NH), 3.28 (sept, J=6.7 Hz, 2H, CHMe$_2$), 2.70 (m, 2H, 5,5'-H in tetrahydronaphthyl), 2.36 (m, 2H, 8,8'-H in tetrahydronaphthyl), 1.79 (m, 2H, 7,7'-H in tetrahydronaphthyl), 1.70 (m, 2H, 6,6'-H in tetrahydronaphthyl), 1.15 (d, J=6.7 Hz, 6H, CHMeMe'), 1.14 (d, J=6.7 Hz, 6H, CHMeMe').

N-{[1-(6-{[(2,6-Diisopropylphenyl)amino]methyl}pyridin-2-yl)-2-naphthyl]methyl}naphthalen-1-amine (6j)

Anal. calc. for C$_{39}$H$_{39}$N$_3$: C, 85.21; H, 7.15; N, 7.64. Found: C, 85.36; H, 7.32; N, 7.42.

$^1$H NMR (CDCl$_3$): δ 7.92 (d, J=8.4 Hz, 1H, 4-H in naphthylidene), 7.90 (m, 1H, 8-H in naphthylidene), 7.70-7.78 (m, 4H, 4-H in Py and 3,5-H in naphthylidene and 8-H in naphthyl), 7.17-7.51 (m, 9H, 3,5-H in Py and 6,7-H in naphthylidene and 3,4,5,6,7-H in naphthyl), 7.01-7.08 (m, 3H, 3,4,5-H in 2,6-diisopropylphenyl), 6.53 (m, 1H, 2-H in naphthyl), 4.91 (br.s, 1H, NH), 4.38 (m, 2H, CH$_2$NH-2,6-diisopropylphenyl), 4.23 (m, 2H, CH$_2$NH-naphthyl), 3.99 (br.s, 1H, NH), 3.23 (sept, J=6.7 Hz, 2H, CHMe$_2$), 1.13 (d, J=6.7 Hz, 6H, CHMeMe'), 1.10 (d, J=6.7 Hz, 6H, CHMeMe').

Synthesis of Pyridyl Diamide Metal Complexes

Scheme 2 exemplifies some pyridyldiamide complexes and an outline of the general synthetic route used to prepare them. A detailed synthesis is presented for complex A1. All other complexes were prepared analogously to complex A1.

Scheme 2. Synthesis of pyridyldiamide complexes

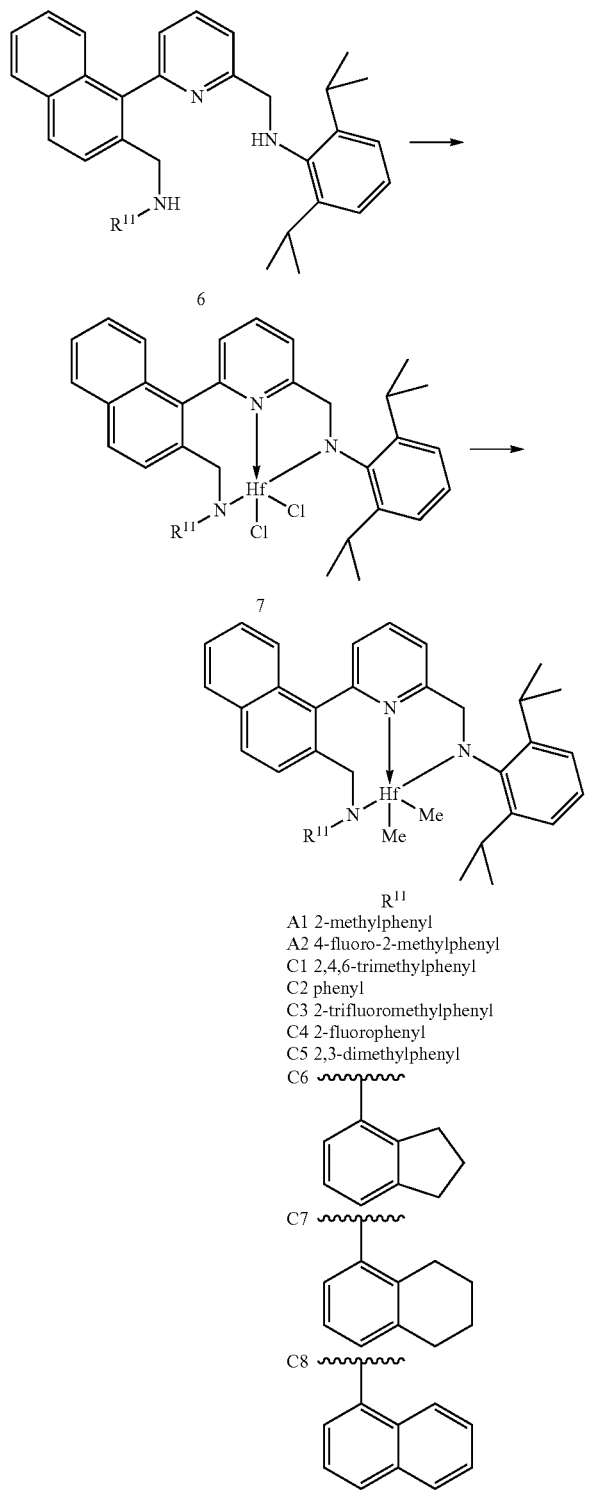

A1 2-methylphenyl
A2 4-fluoro-2-methylphenyl
C1 2,4,6-trimethylphenyl
C2 phenyl
C3 2-trifluoromethylphenyl
C4 2-fluorophenyl
C5 2,3-dimethylphenyl
C6 (indanyl)
C7 (tetrahydronaphthyl)
C8 (naphthyl)

Complex A1.

Toluene (50 mL) was added to the pyridyldiamine 6a (2.07 g, 4.03 mmol) and Hf(NMe$_2$)$_2$Cl$_2$(dme) (dme=1,2-dimethoxyethane) (1.73 g, 4.03 mmol) to form a yellow solution. The mixture was heated to 95° C. in the dark. After 2.5 hours the suspension was cooled to ambient temperature for a couple of hours. The resulting solid was collected on a glass frit and washed with toluene (2×5 mL) and then dried under reduced pressure to afford 2.4 grams of the intermediate dichloride derivative as a white solid. Proton NMR spectroscopy indicated the presence of 0.46 equivalents of toluene. This dichloride derivative (2.40 g, 2.99 mmol) was combined with CH$_2$Cl$_2$ (100 mL) and cooled to −40° C. A solution of Me$_2$Mg (15.3 mL, 3.59 mmol) in Et$_2$O was added dropwise. After 0.5 h the mixture was allowed to warm to ambient temperature. The volatiles were then evaporated and the residue was extracted with CH$_2$Cl$_2$ and filtered. The volatiles were removed to afford the crude product that was washed with pentane. Drying under reduced pressure afforded product as a white solid (2.01 g, 93.3%). $^1$H NMR (400 MHz, CD$_2$Cl$_2$): 8.2-6.9 (aryls, 16H), 5.07 (AB quartet, Δυ=130 Hz, J=20 Hz), 4.49 (br, 1H), 4.14 (br, 1H), 3.74 (sept, 1H), 3.02 (br sept 1H), 2.30 (br, 3H), 1.4-1.0 (m, 11H), 0.89 (t, 2H), 0.55 (d, 3H), −0.80 (s, 3H), −1.13 (s, 3H).

Complex A2.

$^1$H NMR (500 MHz, CD$_2$Cl$_2$): 8.09 (br, 2H), 7.97 (d, 1H), 7.75-7.48 (m, 6H), 7.1-6.94 (m, 5H), 6.78 (br, 1H), 5.20 (d, 1H), 4.90 (br d, 1H), 4.5-3.7 (v br, 2H), 3.73 (sept, 1H), 3.1-1.8 (v br, 3H), 1.17 (d, 6H), 1.09 (d, 3H), 0.63 (br s, 3H), −0.80 (s, 3H), −1.14 (br s, 3H).

Complex C3.

NMR characterization data is broad and complex.

Complex C4.

$^1$H NMR (400 MHz, CD$_2$Cl$_2$): 8.2-6.9 (m, 15H), 5.03 (AB quartet, 2H), 4.42 (AB quartet, 2H), 3.74 (sept, 1H), 3.07 (sept, 1H), 1.15 (m, 9H), 0.62 (d, 3H), −0.65 (s, 3H), −1.09 (s, 3H).

Complex C5.

Proton NMR data is complex and broad and suggests the presence of multiple rotational isomers.

Complex C6.

$^1$H NMR (400 MHz, CD$_2$Cl$_2$): 8.2-7.5 (m, 9H), 7.1-6.7 (m, 6H), 5.01 (AB quartet, 2H), 4.38 (AB quartet, 2H), 3.73 (sept, 1H), 2.9 (m, 4H), 2.6 (m, 1H), 2.01 (m, 2H), 1.16 (d, 3H), 1.10 (m, 6H), 0.51 (d, 3H), −0.70 (s, 3H), −1.14 (s, 3H).

Complex C7.

Proton NMR data is complex and broad and suggests the presence of multiple rotational isomers.

Complex C8.

Proton NMR data is complex and broad and suggests the presence of multiple rotational isomers.

Preparation of Supported Catalyst Systems

The supported catalyst systems comprising Complex A1 are used herein as examples describing the preparation processes.

Example 1: Preparation of the Supported Catalyst System Having Non-Fluorided Silica Calcined at 600° C.

(i) Preparation of Combination of MAO/Silica (sMAO-D948-600° C.)

DAVIDSON 948 silica (45.6903 g) calcined at 600° C. was slurried in 250 mL of toluene and heated to 80° C. MAO (79.25 g of a 30 wt % solution in toluene) was added slowly to the slurry, producing some bubbling. The slurry was stirred for 1 hour. The slurry was filtered, washed twice with 25 mL of toluene and dried under vacuum for two days. 68.11 g of white solid was obtained.

(ii) Preparation of the Supported Catalyst System (sMAO-D948-600° C.)

sMAO-D948-600° C. (0.7835 g) was slurried in 20 mL of toluene. The catalyst Complex A1 (23.7 mg, 0.0312 mmol)

was dissolved in 5 mL of toluene. The catalyst solution was added to the slurry and stirred for 2 hr. The slurry was filtered, washed twice with 20 mL of toluene, washed once with pentane, and dried under vacuum overnight. 0.7376 g of white solid was collected.

Example 2: Preparation of Supported Catalyst System Having Non-Fluorided Silica Calcined at 600° C.

(i) Preparation of Combination of MAO/Silica (sMAO-D948-600° C.)

DAVIDSON 948 silica (45.6903 g) calcined at 600° C. was slurried in 250 mL of toluene and heated to 80° C. MAO (79.25 g of a 30 wt % solution in toluene) was added slowly to the slurry, producing some bubbling. The slurry was stirred for 1 hour. The slurry was filtered, washed twice with 25 mL of toluene and dried under vacuum for two days. 68.11 g of white solid was obtained.

(ii) Preparation of the Supported Catalyst System (sMAO-D948-600° C.)

In a 20 ml glass vial in the dry box was added 1 g sMAO-D948-600° C., and 3 g Toluene was added to the vial, followed by 1 g toluene solution containing Complex A1 (38 μmol). The vial was fitted with a cap and then vortexed at room temperature for 90 minutes. The resulting slurry was filtered through a 25 ml Optichem disposable polyethylene frit and rinsed with 3 g toluene for 2 times, 3 g pentane for 3 times, and was dried in vacuo 0.97 g of supported catalyst b was obtained.

Example 3: Preparation of Supported Catalyst System Having Fluorided Silica Calcined at 200° C. Via Dry Mixing (i) Preparation of Fluorided Silica (F-D948-200° C.)

DAVIDSON 948 silica (50 g) and $(NH_4)_2SiF_6$ (2.3 g) were tumbled together for 1 hr. The silica was then placed in a tube furnace and fluidized with 1.1 SLPM (standard liters per minute) of nitrogen. The tube was heated at 25° C./hr to 150° C., held for 4 hrs, then ramped at 50° C./hr to 200° C. and held there for another 4 hr. The tube was allowed to cool to ambient temperature. 47 g of F-D948-200° C. was collected after the calcination.

(ii) Preparation of Combination of MAO/Fluorided Silica (sMAO-F-D948-200° C.)

36 g MAO toluene solution (Albermarle, 13.6 wt % Al) and 68 g of anhydrous toluene were combined in a 125 ml Celstir™. The stirring rate was set to 450 rpm. F-D948-200° C. (26 g) was slowly added to the Celstir™ in 5 g increments. The resulting slurry was stirred for 15 minutes at room temperature. Then the Celstir™ was heated to 100° C. for 3 hours. The final slurry was filtered through a 110 ml Optichem disposable polyethylene frit. The solid collected in the frit was first rinsed with 30 g toluene for 2 times, then 30 g pentane for 3 times. The solid was dried in vacuo for 3 hours. 34.9 g of sMAO-F-D948-200° C. was obtained. Calculated Al loading: 4.2 mmol "Al"/g sMAO-F-D948-200° C.

(iii) Preparation of Supported Catalyst System (sMAO-F-D948-200° C.)

In a 20 ml glass vial in the dry box, 1 g sMAO-F-D948-200° C. and 3 g Toluene were added separately, followed by 1 g toluene containing Complex A1 (41 μmol). The vial was fitted with a cap and then vortexed at room temperature for 90 minutes. The resulting slurry was filtered through a 25 ml Optichem disposable polyethylene frit and rinsed with 3 g toluene for 2 times and 3 g pentane for 3 times, then was dried in vacuo. 0.997 g of supported catalyst a was obtained.

Example 4: Preparation of Supported Catalyst System Having Fluorided Silica Calcined at 200° C. Via Dry Mixing (i) Preparation of Fluorided Silica (F-D948-200° C.)

DAVIDSON 948 Silica (142.50 g) is tumbled with $(NH_4)_2SiF_6$ for 1 hr. The silica was then placed in a tube furnace and fluidized with 1.1 SLPM (standard liters per minute) of nitrogen. The tube was heated at 25° C./hr to 150° C., held for 4 hrs, then ramped at 50° C./hr to 200° C. and held there for another 4 hrs. The tube was allowed to cool to ambient temperature. 139.141 g of white powder was collected under an inert atmosphere.

(ii) Preparation of Combination of MAO/Fluorided Silica (sMAO-F-D948-200° C.)

MAO (37.5787 g of 30 wt % in toluene) was added to a Celstir™ along with 100 mL of toluene. F-D948-200° C. (29.9322 g) was added to the slurry in 5 g increments. The reaction stirred for 10 minutes at room temperature and was then heated to 100° C. for 3 hours. The solid was filtered, washed twice with 80 mL of toluene, washed twice with pentane, then dried under vacuum overnight. 39.61 g of sMAO-F-D948-200° C. was collected.

(iii) Preparation of Supported Catalyst System (sMAO-F-D948-200° C.)

Complex A1 (28.8 mg, 0.0380 mmol) was dissolved in 10 mL of toluene. sMAO-F-D948-200° C. (0.9521 g) is slurried in 20 mL of toluene. The catalyst Complex A1 is added to the slurry and stirred for 4 hr 15 min. The slurry was filtered, washed three times with 20 mL of toluene and once with pentane, and dried under vacuum overnight. 0.775 g of yellowish solid was collected.

Example 5: Preparation of Supported Catalyst System Having Non-Fluorided Silica Calcined at 200° C. (sMAO-D948-200° C.)—LGPR-Scale Preparation (i) Preparation of Combination of MAO/Silica (sMAO-D948-200° C.)

In a 125 ml Celstir™, 24.4 g of DAVIDSON 948 silica calcined at 200° C. and 100 g of toluene were combined. At stir rate of 450 rpm, 39.4 g of MAO toluene solution (Albermarle, 13.6 wt % Al) was added dropwisely to the Celstir™ with a pipette. The resulting slurry was stirred at room temperature for 15 min and then heated to 80° C. for 4 hrs. at 250 rpm. The slurry was then filtered through a frit and the solid MAO-D948-200° C. was rinsed with 30 g toluene for 2 times. The sMAO-D948-200° C. was then transferred back to the Celstir™ without drying in vacuo.

(ii) Preparation of Supported Catalyst System (sMAO-D948-200° C.)

30 g of toluene was added to the Celstir™, followed by the dropwise addition of Complex A1 toluene solution (1.32 mmol Complex A1 in 36.8 g toluene). The resulting mixture was stirred at room temperature for 1.5 hr. The slurry was filtered, washed three times with 20 mL of toluene and once with pentane, and dried under vacuum overnight. 33.6 g of supported catalyst was collected.

Polymerization of Olefin Monomers

Example 6: Slurry Phase Polymerization of Ethylene and 1-Hexene

All of the examples were produced in a 1-liter stirred-tank reactor operated in a solution process. The autoclave reactor was equipped with a stirrer, a water-cooling/steam-heating element with a temperature controller, and a pressure controller. Solvents and monomers were first purified by passing through a three-column purification system. Purification columns were regenerated periodically whenever there was evidence of lower activity of polymerization.

Isohexane was used as a solvent. The solvent was fed into the reactor using a Pulsa pump and its flow rate was controlled by a mass flow controller. Ethylene was delivered as a gas solubilized in the chilled solvent/monomer mixture. The solvent and monomer were fed into a manifold first. The mixture of solvent and monomers were then chilled to about −15° C. by passing through a chiller prior to feeding into the reactor through a single tube. The collected samples were first air-dried in a hood to evaporate most of the solvent and unreacted monomers, and then dried in a vacuum oven at a temperature of about 90° C. for about 12 hours. The vacuum oven dried samples were weighed to obtain yields. Ethylene and 1-hexene conversion was calculated based on the polymer yield, composition and the amount of monomers fed into the reactor.

Catalyst system used in the following examples was sMAO-D948-600° C. prepared in Example 1. Tri-n-octyl-aluminum (TnOAl) solution (available from Sigma Aldrich, Milwaukee, Wis.) was further diluted in hexane and used as a scavenger. The detailed process conditions and some analytical results are summarized in Table 1.

The resultant polymer was analyzed by Rapid GPC (see below) to determine the molecular weight, by FT-IR (see below) to determine percent of 1-hexene incorporation, and by DSC (see below) to determine melting point.

To determine various molecular weight related values by GPC, high temperature size exclusion chromatography was performed using an automated "Rapid GPC" system as generally described in U.S. Pat. No. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm*7.5 mm linear columns, each containing PLgel 10 μm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector. The molecular weights presented are relative to linear polystyrene standards and are uncorrected.

Differential Scanning calorimetry (DSC) measurements were performed on a TA-Q100 instrument to determine the melting point (Tm) of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period. The weight percent of hexene incorporated in the ethylene-hexene copolymers was determined by rapid FT-IR spectroscopy on a Bruker Equinox 55+ IR in reflection mode. Samples were prepared in a thin film format by evaporative deposition techniques.

TABLE 1

Slurry Phase Polymerization of Ethylene and 1-Hexene
Conditions: isohexane solvent; polymerization temperature is 85° C.;
pressure of ethylene is about 130 psi.

| Supported catalyst batch # | Comonomer | Time (min) | Yield (g) | MI* | DSC $2^{nd}$ Tm | Wt % $C_6$ |
|---|---|---|---|---|---|---|
| 184 | 1-hexene (50 mL) | 40 | 50.939 | — | 75 | — |
| 186 | 1-hexene (25 mL) | 40 | 121.388 | — | 103.8 | 10.4 |
| 187 | 1-hexene (10 mL) | 40 | 11.685 | — | 123.9 | 4.9 |
| 191 | 1-hexene (20 mL) | 20 | 61.731 | — | 106.9 | 8.3 |
| 193 | 1-hexene (10 mL) | 20 | 61.639 | — | 119.5 | 5.6 |
| 198 | 1-hexene (10 mL) | 30 | 19.509 | — | 125.5 | 4.8 |
| 195 | None | 40 | 2.9694 | — | 135.3 | 0 |

*— means MI is unmeasurable.

Example 7: Slurry Phase Polymerization of Ethylene and 1-Hexene in a Parallel Reactor—High Throughput Polymerizations of Ethylene and 1-Hexene Ethylene and 1-hexene copolymerizations were carried out in a parallel pressure reactor, as generally described in U.S. Pat. Nos. 6,306,658; 6,455,316; 6,489,168; WO 00/09255; and Murphy et al., J. Am. Chem. Soc., 2003, 125, pp. 4306-4317, each of which is fully incorporated herein by reference for US purposes. Although the specific quantities, temperatures, solvents, reactants, reactant ratios, pressures, and other variables are frequently changed from one polymerization run to the next, the following describes a typical polymerization performed in a parallel pressure reactor. A pre-weighed glass vial insert and disposable stirring paddle were fitted to each reaction vessel of the reactor.

The reactor was prepared as described above, and then purged with ethylene. Isohexane, 1-hexene and TnOAl were added via syringe at room temperature and atmospheric pressure. The reactor was then brought to process temperature (85° C.) and charged with ethylene to process pressure (130 psig=896 kPa) while stirring at 800 RPM. The supported catalyst b prepared in Example 2 and the supported catalyst a prepared in Example 3 (100 μL of a 3 mg/mL toluene slurry, unless indicated otherwise) were added via syringe with the reactor at process conditions. TnOAl was used as 200 μL of a 20 mmol/L in isohexane solution. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi $O_2$/Ar (5 mol % $O_2$) gas mixture to the autoclaves for approximately 30 seconds. The polymerizations were quenched after a predetermined cumulative amount of ethylene had been added or for a maximum of 4520 minutes polymerization time. The reactors were cooled and vented. The polymer was isolated after the solvent was removed in-vacuo. Catalyst activity is reported as kilograms of polymer per mol transition metal compound per hour of reaction time (kg/mol•hr). The results of polymerization are shown in Table 2.

The resultant polymer was analyzed by Rapid GPC (see below) to determine the molecular weight and by FT-IR (see below) to determine percent of 1-hexene incorporation.

TABLE 2

Slurry Phase Polymerization of Ethylene and 1-Hexene in a Parallel Reactor

| Run | Supported catalyst | HTPT Exp. # | mol % C6 | Activity (kg/mol * hr) | Mw | wt % C6 |
|---|---|---|---|---|---|---|
| 117-1 | Catalyst b: | 118 | 6 | 5886 | 3195011 | 4.0 |
| 117-1 | sMAO-D948-600° C. | | 11 | 100327 | 2159850 | 6.8 |
| 092-1 | Catalyst a: | 093 | 6 | 21549 | 2100163 | 5.6 |
| 092-1 | sMAO-F-D948-200° C. | | 11 | 55637 | 2678512 | 6.6 |
| 092-1 | | 112 | 6 | 16621 | 3312336 | 4.6 |
| 092-1 | | | 11 | 32374 | 3334966 | 5.8 |
| 092-1 | | 118 | 6 | 26994 | 3131745 | 4.8 |
| 092-1 | | | 11 | 78254 | 2654961 | 6.7 |

As can be seen from Table 2, the catalyst systems can produce ultrahigh molecular weight ethylene copolymer and also show an improved incorporation of hexene comonomer. In addition, fluorided catalyst systems exhibited higher activity and percent of comonomer incorporation.

Example 8: Gas Phase Polymerization of Ethylene and 1-Hexene

Polymerization was performed in a fluidized bed reactor with a 6" body and a 10" expanded section at the top. Cycle and feed gases were fed through a perforated distributor plate that disperses the gas and keeps the bed in place. Reactor temperature was maintained by heating the cycle gas, and the reactor was vented as necessary to maintain the desired ethylene composition. Compositions of all gases listed in Table 3 were monitored by GC. A catalyst suspension of 10 wt % solids in mineral oil was fed continuously throughout the run, and this slurry was thinned and delivered to the reactor by nitrogen and iso-pentane feeds in the cat probe. Polymer products were collected from the reactor as necessary to maintain the desired bed weight. No measurable MI or HLMI was observed up to 1260 ppm hydrogen. This negative response to changes of hydrogen concentration makes the catalyst systems useful to produce multimodal polymers.

TABLE 3

Gas Phase Polymerization of Ethylene and 1-Hexene

| Catalyst | Complex A1 |
|---|---|
| Temperature (° C.) | 85 |
| Pressure (psi) | 300 |
| Ethylene (mole %) | 70 |
| Hydrogen (ppm) | 1260 |
| Hexene (mole %) | 0.42 |
| Bed Weight (g) | 2000 |
| Residence Time (hr) | 6.8 |
| Cycle Gas Velocity (ft/s) | 1.62 |
| Production Rate (g/hr) | 292 |
| Activity ($g_{poly}/g_{supported\ cat}$) | 861 |
| Density (g/cm$^3$) | 0.9179 |
| MI (g/10 min) | — |
| Bulk Density | 0.4119 |
| Catalyst Slurry Feed (cc/hr) | 3.9 |
| N$_2$ Cat. Probe Feed (cc/hr) | 6000 |
| iC$_5$ Cat. Probe Feed (g/min) | 1 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. Likewise, the terms "comprising," "consisting essentially of," "consisting of", also include the product of the combinations of elements listed after the term.

What is claimed is:

1. A supported catalyst system comprising:
   (i) a pyridyldiamido transition metal complex having the general formula (II) or (III);

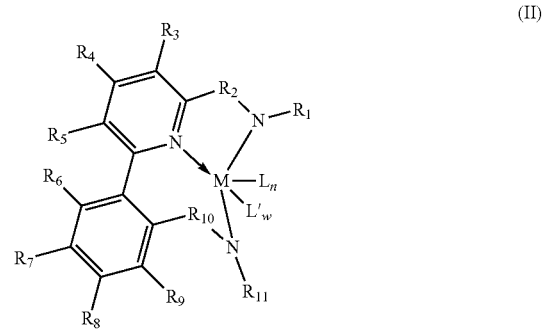

(II)

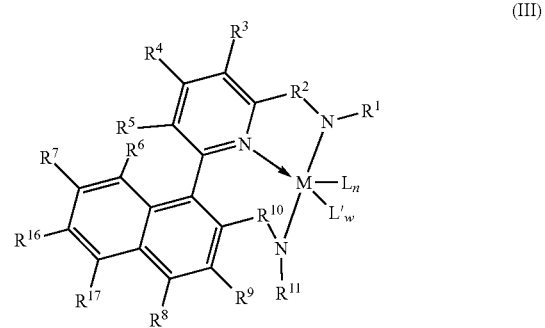

(III)

(ii) an activator; and
(iii) a fluorided support material;
wherein;
   M is Ti, Zr, or Hf;
   $R_1$, $R^1$, $R_{11}$, and $R^{11}$ are independently selected from the group consisting of phenyl groups that are variously substituted with between zero to five substituents selected from F, Cl, Br, I, CF$_3$, NO$_2$, alkoxy groups having one to ten carbons, dialkylamino groups having one to ten carbons, hydrocarbyl groups having one to ten carbons, and substituted hydrocarbyl groups having one to ten carbons;
   $R_2$, $R^2$, $R_{10}$, and $R^{10}$ are independently —E(R$_{12}$)(R$_{13}$)— with E being carbon, and each R$_{12}$ and R$_{13}$ being independently selected from the group consisting of hydrogen, hydrocarbyls, alkoxy, silyl, amino, aryloxy, substituted hydrocarbyls, halogen, and phosphino;

$R_{12}$ and $R_{13}$ may be joined to form a saturated heterocyclic ring, or a saturated substituted heterocyclic ring where substitutions on the ring can join to form additional rings;

$R_3$, $R^3$, $R_4$, $R^4$, $R_5$, and $R^5$ are independently selected from the group consisting of hydrogen, hydrocarbyls, substituted hydrocarbyls, alkoxy, aryloxy, halogen, amino, and silyl, and wherein adjacent R groups ($R_3$ & $R_4$, $R^3$ & $R^4$, $R_4$ & $R_5$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R_6$, $R^6$, $R_7$, $R^7$, $R_8$, $R^8$, $R_9$, $R^9$, $R^{16}$, and $R^{17}$ are independently selected from the group consisting of hydrogen, hydrocarbyls, substituted hydrocarbyls, alkoxy, halogen, amino, and silyl, and the pairs of positions, and wherein adjacent R groups ($R_6$ & $R_7$, $R_7$ & $R_8$, $R_8$ & $R_9$, $R_9$ & $R_{10}$, $R^6$ & $R^7$, $R^7$ & $R^{16}$, $R^{16}$ & $R^{17}$ and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group selected from halide, alkyl, aryl, alkoxy, amido, hydrido, phenoxy, hydroxy, silyl, allyl, alkenyl, and alkynyl, where the L groups may be the same or different and any two L groups may be linked to form a dianionic leaving group;

n is 0, 1, 2, 3, or 4;

L' is a neutral Lewis base selected from ethers, thioethers, amines, nitriles, imines, pyridines, and phosphines;

w is 0, 1, 2, 3 or 4, and wherein the supported catalyst system increases an incorporation of a comonomer into a copolymer during polymerization of a monomer and the comonomer in the presence of the supported catalyst system as compared to a comparative catalyst system that is the same as the supported catalyst system except the support material in the comparative catalyst system is a non-fluorided support material.

2. The supported catalyst system of claim 1, wherein the groups represented by $R_3$ to $R_9$, or $R_{12}$ to $R_{15}$ each contain 2 to 20 carbon atoms, and wherein the groups represented by $R_1$ or $R_{11}$ each contain 6 to 20 carbon atoms.

3. The supported catalyst system of claim 1, wherein the fluorided support material has a surface area in the range of from 10 m$^2$/g to 700 m$^2$/g and an average particle diameter in the range of from 10 μm to 500 μm.

4. The supported catalyst system of claim 1, wherein the fluorided support material is selected from the group consisting of fluorided silica, fluorided alumina, fluorided silica-alumina, and combinations thereof.

5. The supported catalyst system of claim 1, wherein the fluorided support material comprises a support material having a fluorine concentration in the range of 0.6 wt % to 3.5 wt %, based upon the weight of the support material.

6. The supported catalyst system of claim 1, wherein the fluorided support material comprises fluorided silica.

7. A process for polymerization of olefin monomers comprising: contacting a monomer and a comonomer with a supported catalyst system to produce a copolymer, wherein the polymerization is carried out in the slurry or gas phase, and wherein the supported catalyst system comprises:

(i) a pyridyldiamido transition metal complex having the general formula (II) or (III);

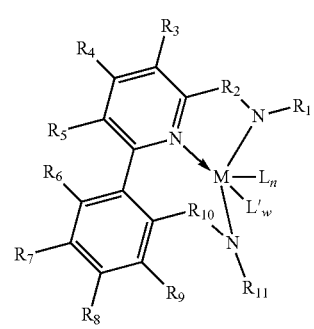

(II)

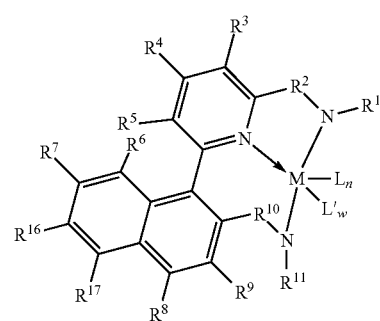

(III)

(ii) an activator; and
(iii) a fluorided support material;

wherein:

M is Ti, Zr, or Hf;

$R_1$, $R^1$, $R_{11}$, and $R^{11}$ are independently selected from the group consisting of phenyl groups that are variously substituted with between zero to five substituents selected from F, Cl, Br, I, CF$_3$, NO$_2$, alkoxy groups having one to ten carbons, dialkylamino groups having one to ten carbons, hydrocarbyl groups having one to ten carbons, and substituted hydrocarbyl groups having one to ten carbons;

$R_2$, $R^2$, $R_{10}$, and $R^{10}$ are independently, —E($R_{12}$)($R_{13}$)— with E being carbon, and each $R_{12}$ and $R_{13}$ being independently selected from the group consisting of hydrogen, hydrocarbyls, alkoxy, silyl, amino, aryloxy, substituted hydrocarbyls, halogen, and phosphino;

$R_3$, $R^3$, $R_4$, $R^4$, $R_5$, and $R^5$ are independently selected from the group consisting of hydrogen, hydrocarbyls, substituted hydrocarbyls, alkoxy, aryloxy, halogen, amino, and silyl, and wherein adjacent R groups ($R_3$ & $R_4$, $R^3$ & $R^4$, $R_4$ & $R_5$ and/or $R^4$ & $R^5$) may be joined to form a substituted or unsubstituted hydrocarbyl or heterocyclic ring, where the ring has 5, 6, 7, or 8 ring atoms and where substitutions on the ring can join to form additional rings;

$R_6$, $R^6$, $R_7$, $R^7$, $R_8$, $R^8$, $R_9$, $R^9$, $R^{16}$, and $R^{17}$ are independently selected from the group consisting of hydrogen, hydrocarbyls, substituted hydrocarbyls, alkoxy, halogen, amino, and silyl, and the pairs of positions, and wherein adjacent R groups ($R_6$ & $R_7$, $R_7$ & $R_8$, $R_8$ & $R_9$, $R_9$ & $R_{10}$, $R^6$ & $R^7$, $R^7$ & $R^{16}$, $R^{16}$ & $R^{17}$ and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base;

w is 0, 1, 2, 3 or 4, and wherein the supported catalyst system increases an incorporation of the comonomer into the copolymer as compared to a comparative catalyst system that is the same as the supported catalyst system except the support material in the comparative catalyst system is a non-fluorided support material.

8. The process of claim 7, wherein the fluorided support material has a surface area in the range of from 10 m²/g to 700 m²/g and an average particle diameter in the range of from 10 µm to 500 µm.

9. The process of claim 7, wherein the fluorided support material is selected from the group consisting of fluorided silica, fluorided alumina, fluorided silica-alumina, and combinations thereof.

10. The process of claim 7, wherein the fluorided support material comprises a support material having a fluorine concentration in the range of 0.6 wt % to 3.5 wt %, based upon the weight of the support material.

11. The process of claim 7, wherein the fluorided support material comprises fluorided silica.

12. The process of claim 7, wherein the monomer comprises ethylene and the comonomer is selected from the group consisting of propylene, 1-butene, 1-pentene, 3-methyl-1-pentene, 4-methyl-1-pentene, 1-hexene, 1-octene, and combinations thereof.

13. The process of claim 7, wherein the polymerization is carried out in slurry phase.

14. An ultrahigh molecular weight polyolefin catalyzed in a slurry or gas phase polymerization process by the supported catalyst system of claim 1, wherein the ultrahigh molecular weight polyolefin has polymer units derived from a monomer and a comonomer, wherein the weight average molecular weight of the polyolefin is greater than 3,000,000 g/mol, wherein the ultrahigh molecular weight polyolefin is a multimodal polyolefin composition comprising a first polyolefin component and a second polyolefin component, and wherein the first polyolefin component and the second polyolefin component have different molecular weights.

15. The ultrahigh molecular weight polyolefin of claim 14, wherein the monomer is ethylene and the comonomer is selected from the group consisting of propylene 1-butene, 1-pentene, 3-methyl-1-pentene, 4-methyl-1-pentene, 1-hexene, and 1-octene.

16. The ultrahigh molecular weight polyolefin of claim 14, wherein a gel permeation chromatography trace of the ultrahigh molecular weight polyolefin has more than one peak or inflection point.

17. The ultrahigh molecular weight polyolefin of claim 14, wherein:
the monomer is ethylene and the comonomer is 1-hexene, and
a gel permeation chromatography trace of the ultrahigh molecular weight polyolefin has more than one peak or inflection point.

18. The supported catalyst system of claim 1, wherein the monomer is ethylene and the comonomer is selected from the group consisting of propylene 1-butene, 1-pentene, 3-methyl-1-pentene, 4-methyl-1-pentene, 1-hexene, and 1-octene.

19. The supported catalyst system of claim 1, wherein the monomer is ethylene and the comonomer is 1-hexene.

20. The supported catalyst system of claim 19, wherein the pyridyldiamido transition metal complex has the formula:

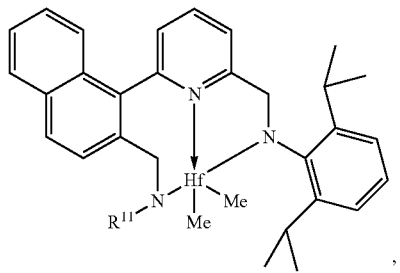

wherein $R^{11}$ is 2-methylphenyl.

21. The process of claim 7, wherein the copolymer has a weight average molecular weight of greater than 3,000,000 g/mol.

22. The process of claim 21, wherein the monomer is ethylene and the comonomer is 1-hexene.

23. The process of claim 22, wherein the pyridyldiamido transition metal complex has the formula:

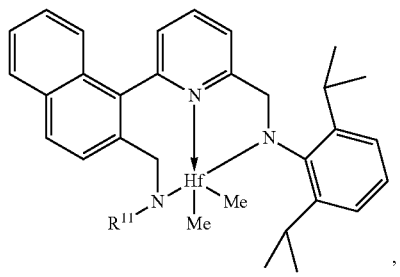

wherein $R^{11}$ is 2-methylphenyl.

24. The process of claim 21, wherein the copolymer is a multimodal polyolefin composition comprising a first polyolefin component and a second polyolefin component, and wherein the first polyolefin component and the second polyolefin component have different molecular weights.

* * * * *